(12) United States Patent
Bark

(10) Patent No.: US 8,438,101 B2
(45) Date of Patent: May 7, 2013

(54) VIRTUAL TRADING MARKET PROVISION SYSTEM AND METHOD USING SYNTHESIS OF INSTRUMENTS

(76) Inventor: Sang Woo Bark, Seoul (KR)

( * ) Notice: Subject to any disclaimer, the term of this patent is extended or adjusted under 35 U.S.C. 154(b) by 14 days.

(21) Appl. No.: 13/316,908

(22) Filed: Dec. 12, 2011

(65) Prior Publication Data

US 2012/0150716 A1     Jun. 14, 2012

(30) Foreign Application Priority Data

Dec. 10, 2010 (KR) .................. 10-2010-0126446
Jul. 28, 2011 (KR) .................. 10-2011-0075370

(51) Int. Cl.
*G06Q 40/00* (2012.01)

(52) U.S. Cl.
USPC .............................. 705/37; 705/36 R

(58) Field of Classification Search ............ 705/36 R, 705/37
See application file for complete search history.

(56) References Cited

U.S. PATENT DOCUMENTS 7,062,459 B1 * 6/2006 Herbst et al. ............. 705/37
7,801,801 B2 * 9/2010 Rosenthal et al. ......... 705/37

* cited by examiner

*Primary Examiner* — Olabode Akintola
(74) *Attorney, Agent, or Firm* — Abelman, Frayne & Schwab

(57) ABSTRACT

Disclosed herein is a trading market provision system and method using synthesis of instruments. The trading market provision system includes a synthesis unit for forming a synthetic group composed of individual items, each having a minimum quantity. A synthetic price calculation unit forms a synthetic price for the synthetic group formed by the synthesis unit. A display unit displays the change in the synthetic price calculated by the synthetic price calculation unit.

44 Claims, 21 Drawing Sheets

FIG.4

| STOCK | BUY/SELL | UNIT PRICE | TICK SIZE | TICK VALUE | |
|---|---|---|---|---|---|
| SAMSUNG ELECTRONICS | BUY | 800,000 | 1,000 | 1,000 | |
| SHINHAN FINANCIAL GROUP | SELL | 40,000 | 500 | 500 | |

| FUTURES | BUY/SELL | INDEX | TICK SIZE | TICK VALUE | MARGIN |
|---|---|---|---|---|---|
| KOSPI 200 | SELL | 250.00 | 0.05 | 25,000 | 12,500,000 |

(Controls: 21a DOMESTIC/INTERNATIONAL — DOMESTIC; 21b INSTRUMENT — STOCK; 21c ITEM — SAMSUNG ELECTRONICS; 21d SELECT TRADE — SELL)

FIG.5

| SELECTED ITEM | RATIO | QUANTITY |
|---|---|---|
| SAMSUNG ELECTRONICS | 2 | |
| SHINHAN FINANCIAL GROUP | 1 | |
| KOSPI 200 | 2 | |

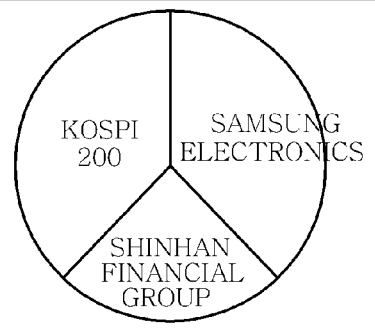

```
┌─ Setting Condition ─────────────────────────────┐
│  170-1 ─┤ Title: [        ]                      │
│  170-2 ─┤ Type: ● Value  ○ Signal                │
│  170-4 ─┐                                        │
│  170-41─┤ Signal: [        ]                     │
│  170-42─┬─ True Value ──────────────────────────┐│
│ 170-42-1│  Function: [None ▼]                   ││
│ 170-42-2│  Select:   [      ]                   ││
│ 170-42-3│  Symbol:   [Chart ▼]                  ││
│ 170-42-4│  TF:       [Chart ▼]                  ││
│ 170-42-5│  Bar:      [0]                        ││
│ 170-42-6│  Add:      [        ]                 ││
│         │  Price                                ││
│         │  Candle Height                        ││
│         │  Time                                 ││
│         │  Open Position                        ││
│         │  Indicator                            ││
│         │  Etc                                  ││
│         │  Custom Indicator                     ││
│         │  Direct Input                         ││
│         │  Import Value                         ││
│         └───────────────────────────────────────┘│
│  170-43─┬─ False Value ─────────────────────────┐│
│ 170-43-1│  Function: [None ▼]                   ││
│ 170-43-2│  Select:                              ││
│ 170-43-3│  Symbol:   [Chart ▼]                  ││
│ 170-43-4│  TF:       [Chart ▼]                  ││
│ 170-43-5│  Bar:      [0]                        ││
│ 170-43-6│  Add:      [        ]                 ││
│         │  Price                                ││
│         │  Candle Height                        ││
│         │  Time                                 ││
│         │  Open Position                        ││
│         │  Indicator                            ││
│         │  Etc                                  ││
│         │  Custom Indicator                     ││
│         │  Direct Input                         ││
│         │  Import Value                         ││
│         └───────────────────────────────────────┘│
│           Memo: [                             ]  │
│                                                  │
│              [Add] [Edit] [Delete]               │
└──────────────────────────────────────────────────┘
```

FIG. 23

```
┌─ Setting OptionFrame ─────────────────────────────────────────────┐
│                                                                    │
│         Title: [Title  ]                                           │
│      MagicNo: [10000 ] □Extern Value                               │
│   MaxSlippage: Open [3] Pip □Extern Value                          │
│                Close[3] Pip □Extern Value                          │
│     MaxSpread: Open [3] Pip □Extern Value                          │
│                Close[3] Pip □Extern Value                          │
│  Allow Account: □ [                              ]                 │
│   Expired Time: □ [                              ]                 │
│     Allow Mode: ☑Real mode ☑Demo mode ☑Test Mode ☑Optical Mode ☑Visual Mode │
│        Display: Display Position:[None    ] Label Display:□ Font Size:[12]Pt │
│   Display Item: □EA Name □Account Number □Account Equity □Profit/Loss □Open Count │
│                 □First Open Price □Last Open Price □Local Time □Broker Time │
│                                                                    │
│  [Add][Edit][Delete]                                               │
└────────────────────────────────────────────────────────────────────┘
```

```
┌─ Setting ManagementFrame ────────────────────────┐
│                                                   │
│           Title: [Title      ]                    │
│         FundLOt: □ [10] %                         │
│       FundClose: [          ]                     │
│ FundClose Amount: [increase □] [10]  %            │
│ FundClose Amount: [increase □] [10000]            │
│                                                   │
│  [Add][Edit][Delete]                              │
└───────────────────────────────────────────────────┘
```

200-1 — Title: [ ]
200-2 — WindowType: ⊙ chart  ○ separate
200-3 — Indexcount: ⊙ 1  ○ 2  ○ 3  ○ 4  ○ 5  ○ 6  ○ 7  ○ 8

200-4 — Condition Setting
☐ 1 Test1 (Candle)
☐ 2 Band_Dff1 (BandU+10)
☐ 3 Band_Dff2 (BandL-10)
☐ 4 Band_Dff3 (BandCenter)
☐ 5 ()
☐ 6 ()

Memo: [ ]

[Add] [Edit] [Delete]

FIG.26

```
┌─ Setting Condition ─────────────────────────────────────────┐
210-1─┤  Title: [                                        ]     │
210-2─┤  Label: [           ]                                  │
210-3─┤  Style: ◉ LINE  ○ HISTOGRAM  ○ ARROW  ○ NONE  ○ SECTION  ○ ZIGZAG  │
210-4─┤  Width: ◉ 1  ○ 2  ○ 3  ○ 4  ○ 5                        │
210-5─┤  Color: [ ] [           ]                              │
210-6─┤  Type:  ◉ Value  ○ Signal                              │
```

- 210-71  Function: None
- 210-72  Select:
- 210-73  Symbol: Chart
- 210-74  TF: Chart
- 210-75  Bar: 0

Value Expression — Mouse drag select extem tex [extern1] Exten 210-7:
- Price
- Candle Height
- Time
- Open Position
- Indicator
- Etc
- Custom Indicator
- Direct Input
- Import Value Memo:

[Add] [Edit] [Delete]

210-76

VIRTUAL TRADING MARKET PROVISION SYSTEM AND METHOD USING SYNTHESIS OF INSTRUMENTS

CROSS REFERENCE TO RELATED APPLICATIONS

This application claims the benefit of Korean Patent Application Nos. 10-2010-0126446 filed on Dec. 10, 2010 entitled "Virtual Market Apparatus of Synthetic Instruments and Method thereof" and 10-2011-0075370 filed on Jul. 28, 2011 entitled "Trading Strategy Establishment Apparatus", which are hereby incorporated by reference in their entireties into this application.

BACKGROUND OF THE INVENTION

1. Technical Field

The present invention relates to a virtual trading market provision system and method using the synthesis of instruments, which enable instruments to be implemented as a single virtual instrument that can be traded by using the synthesis of instruments and yield curves.

2. Description of the Related Art

In past international financial markets, a large number of financial instruments have been developed so as to satisfy abundant international liquidity and various client needs. Even in the spot market, as technical skills have progressively improved, lively economic activities have been carried out. The development of such economic activities has activated trading on financial instruments, such as stocks, bonds, futures, options, and currency which are the media of economic activities.

The demand for Internet trading which allow clients to access the server of an investment company using computer terminals from a remote place and conduct trading on stocks, bonds, futures, currency, and options has explosively increased.

As trading using networks has been activated in this way, the importance of a Home Trading System (HTS) has gradually increased in which an investment company provides investors with a program for online stock trading, and in which the investors may install the program on their computers or mobile devices (for example, Personal Digital Assistants (PDA), and wired/wireless exclusive terminals provided by security companies) and then trade stocks in real time over a wired or wireless network.

Most private investors have traded stocks using such a home trading system, and have frequently obtained information about their desired investment target businesses online.

It is important to select items upon investment in financial instruments such as stocks, bonds, currency, futures, and options, and the profits of investors may be maximized or the loss of the investors may increase depending on which items have been selected by the investors.

Therefore, various techniques have recently been mobilized to select items.

However, since a variety of conventional item selection methods that were provided are related to only one type of financial instrument, use of the methods when trading on various financial instruments including stocks, bonds, currency, futures, and options is more limited than desired.

Further, accessing a variety of conventional item selection methods that were provided is complicated, so that it is difficult for general investors to access such methods.

In particular, the conventional technology is problematic in that though strategies, techniques or technical indicators have diversified, all investors participate in existing identical markets and conduct trading. Furthermore, a portfolio is the concept of distributed investment, and such a distributed investment is made while viewing separate markets, but there is a problem in that the investors conduct trading while always watching each identical market.

Accordingly, since all investors recognize trading patterns approaching each market and conduct trading, a problem arises in that the traffic of the investors increases in a principal interval, thus making it difficult to realize profits.

SUMMARY OF THE INVENTION

Accordingly, the present invention has been made keeping in mind the above problems occurring in the prior art, and the present invention is intended to provide a trading market provision system and method using the synthesis of instruments, which allow each investor to select various items from among various financial instruments (products), such as stocks, bonds, currency, futures, and options, and to synthesize the selected items and which allow a virtual investment to be made depending on various investment strategies that are established for a group of the synthesized items (synthetic instruments).

Further, the present invention is intended to provide a trading market provision system and method using the synthesis of instruments, which provide the results of the progress of a virtual investment based on investment strategies to a user in the form of highly-readable graphs including candlesticks/bars and allow the user to make an investment with reference to the provided graphs or the like and subsequently conduct actual trading.

Furthermore, the present invention is intended to provide a trading market provision system and method using the synthesis of instruments, which calculate the movement of yield curves based on instrument prices and strategies in the form of a management report, thus enabling trading to be conducted.

In accordance with the present invention, there is provided a trading market provision system using synthesis of instruments, including a synthesis unit for providing an instrument synthesis screen and a ratio selection screen to a user terminal over a communication network, and receiving selected instruments, selected items, and a synthesis ratio from the user terminal, and forming a synthetic group composed of individual items, each having a minimum quantity; a synthetic price calculation unit for forming a synthetic price for the synthetic group formed by the synthesis unit, receiving real-time prices of the respective items that form the synthetic group from a securities/futures computerization agency, and calculating a change in the synthetic price of the synthetic group; and a display unit for displaying the change in the synthetic price calculated by the synthetic price calculation unit.

Further, in accordance with the present invention, there is provided a trading market provision method using synthesis of instruments, including (A) a synthesis unit providing an instrument synthesis screen and a ratio selection screen to a user terminal over a communication network, and receiving selected instruments, selected items, and a synthesis ratio from the user terminal, and forming a synthetic group composed of individual items, each having a minimum quantity; (B) a synthetic price calculation unit forming a synthetic price for the synthetic group formed by the synthesis unit, receiving real-time prices of the respective items that form the synthetic group from a securities/futures computerization agency, and calculating a change in the synthetic price of the synthetic group; and (C) a display unit displaying the change in the synthetic price calculated by the synthetic price calculation unit.

In addition, in accordance with the present invention, there is provided a strategy establishment device, including a mutual comparison condition strategy establishment unit for setting comparison conditions between price, indicators, and oscillators and then establishing a plurality of mutual comparison condition strategies; a signal generation strategy establishment unit for combining the plurality of mutual comparison condition strategies established by the mutual comparison condition strategy establishment unit, thus establishing a plurality of signal generation strategies; and a strategy establishment unit for combining the plurality of signal generation strategies established by the signal generation strategy establishment unit, thus establishing trading strategies.

In one particular embodiment, a trading market provision system using synthesis of instruments comprises: a synthesis unit for providing an instrument synthesis screen and a ratio selection screen to a user terminal over a communication network, and receiving selected instruments, selected items, and a synthesis ratio from the user terminal, and forming a synthetic group composed of individual items, each having a minimum quantity;

a synthetic price calculation unit for forming a synthetic price for the synthetic group formed by the synthesis unit, receiving real-time prices of the respective items that form the synthetic group from a securities/futures computerization agency, and calculating a change in the synthetic price of the synthetic group; and a display unit for displaying the change in the synthetic price calculated by the synthetic price calculation unit.

In one aspect of the trading market provision system as set forth above, instruments that can be selected by a user using the user terminal from the instrument synthesis screen provided by the synthesis unit comprise at least one of stocks, bonds, futures, options, and currency. In another aspect of the trading market provision system as set forth above, a selection ratio provided by the synthesis unit via the ratio selection screen is a selection ratio based on prices.

In yet another aspect of the trading market provision system as set forth above, the synthetic price calculation unit calculates the synthetic price by calculating converted prices of the respective items using the following equation and adding up calculated converted prices:

converted price=(price(or index)/tick size)*tick value*exchange rate.

In another aspect, the trading market provision system as set forth above further comprises: a strategy establishment device for receiving a strategy required to determine a trading time for the synthetic group calculated by the synthesis unit from the user via the user terminal and then establishing trading strategies; and a strategy execution unit for conducting virtual trading for the synthetic group depending on the strategies established by the strategy establishment device and calculating profits based on the virtual trading, wherein the display unit displays the profits calculated when the strategy execution unit executes the strategies.

In one aspect of the trading market provision system as set forth above, the strategy execution unit calculates and provides technical indicators for the profits. In another aspect of the trading market provision system as set forth above, the strategy execution unit provides technical indicators for different time frames so that they overlap with each other when calculating and providing the technical indicators for the profits. In yet another aspect of the trading market provision system as set forth above, the strategy execution unit provides a plurality of results of execution based on a plurality of strategies by displaying the execution results on the display unit. In still another aspect of the trading market provision system as set forth above, the strategy execution unit provides a total profit, obtained by adding up results of execution based on a plurality of strategies, by displaying the total profit on the display unit.

In one aspect of the trading market provision system as set forth above, the display unit displays results of the virtual trading conducted by the strategy execution unit in a form of a candlestick chart. In another aspect, the trading market provision system as set forth above further comprises a report provision unit for providing the results of virtual trading conducted by the strategy execution unit in a format of a report.

In one aspect of the trading market provision system as set forth above, the report provided by the report provision unit comprises at least one of a drawdown, a drawdown percentage, a trading profit, a trading profit percentage, a number of successive profits, successive profits, a number of successive losses, and successive losses. In still another aspect of the trading market provision system as set forth above, data provided by the report provision unit is data calculated by regarding an opening price of each candle in a candlestick chart as an entry point and regarding a closing price of the candle as an exit point in relation to the results of virtual trading conducted by the strategy execution unit. In another aspect, the trading market provision system as set forth above further comprises a trading support unit for receiving a trading request for the synthetic group from the user via the user terminal and conducting trading.

In one aspect of the trading market provision system as set forth above, the trading support unit automatically conducts trading based on trading conditions for the synthetic group when the trading conditions for the synthetic group are received from the user via the user terminal. In another aspect of the trading market provision system as set forth above, the trading support unit provides a room function of showing present conditions of accounts corresponding to respective items and possible quantities of items that are tradable. In still another aspect of the trading market provision system as set forth above, the trading support unit provides, in a case of futures, a gauge function of reporting that an expiration date is approaching and reporting when a maintenance margin increases or decreases and whether to fill the maintenance margin based on the increase/decrease in the maintenance margin.

In another aspect, the trading market provision system as set forth above further comprises a report provision unit for providing results of trading conducted by the trading support unit in a format of a report. In yet another aspect, the trading market provision system as set forth above further comprises a trading support unit for receiving a trading request for the synthetic group from the user via the user terminal and conducting trading.

In one aspect, the trading market provision system as set forth above further comprises a correlation calculation unit for calculating and providing correlations between synthetic prices of synthetic groups calculated by the synthetic price calculation unit. In another aspect, of the trading market provision system as set forth above, the display unit provides the correlations calculated by the correlation calculation unit in a form of a chart.

In another aspect, of the trading market provision system as set forth above, the display unit displays a change in the synthetic price calculated by the synthetic price calculation unit in a form of a candlestick chart. In another aspect, of the trading market provision system as set forth above, the synthesis unit is configured such that when an expiration of an options instrument has been reached, trading of the options instrument exits and the options instrument is deleted from the synthetic group, and such that a futures instrument and other expired instruments are automatically rolled over as outstanding objects, thus enabling the synthetic group to be maintained. In another aspect, of the trading market provision system as set forth above, the strategy establishment device comprises: a mutual comparison condition strategy establishment unit for setting comparison conditions between price, indicators, and oscillators and then establishing a plurality of mutual comparison condition strategies; a signal generation strategy establishment unit for combining the plurality of mutual comparison condition strategies established by the mutual comparison condition strategy establishment unit, thus establishing a plurality of signal generation strategies; and a strategy establishment unit for combining the plurality of signal generation strategies established by the signal generation strategy establishment unit, thus establishing trading strategies.

In another aspect, the trading market provision system as set forth above further comprises a binder strategy establishment unit for combining the plurality of mutual comparison condition strategies established by the mutual comparison condition strategy establishment unit, thus establishing a plurality of binder strategies. In yet another aspect, the trading market provision system as set forth above further comprises a movement strategy establishment unit for defining conditions related to movements, appearing during a predetermined comparison period, for a comparative target, thus establishing movement strategies; a template generation unit for setting functions, comparative targets, and predetermined comparison periods, thus generating a plurality of templates; and a time strategy establishment unit for combining the plurality of mutual comparison condition strategies established by the mutual comparison condition strategy establishment unit, the plurality of movement strategies established by the movement strategy establishment unit, and the plurality of templates generated by the template generation unit, thus establishing time strategies, wherein the strategy establishment unit combines the time strategies established by the time strategy establishment unit, thus establishing the trading strategies, and wherein the signal generation strategy establishment unit combines the time strategies established by the time strategy establishment unit, thus establishing signal generation strategies.

In still another aspect, the trading market provision system as set forth above further comprises a value setting unit for setting values by defining functions, comparative targets, and predetermined comparison periods, or setting values based on whether the signal generation strategies established by the signal generation strategy establishment unit have been fulfilled, wherein the mutual comparison condition strategy establishment unit establishes the mutual comparison condition strategies using the values set by the value setting unit, the movement strategy establishment unit establishes the movement strategies using the values set by the value setting unit, and the template generation unit sets the templates using the values set by the value setting unit.

In another aspect, the trading market provision system as set forth above further comprises an option strategy establishment unit for combining maximum slippage (Maxslippage), maximum spread (Maxspread), strategy activation time, and a reverse function, thus establishing option strategies; and a fund management strategy establishment unit for establishing fund management strategies required to determine available funds from among holding funds, wherein the strategy establishment unit combines the option strategies established by the option strategy establishment unit and the fund management strategies established by the fund management strategy establishment unit with the established trading strategies.

In yet another aspect, the trading market provision system as set forth above further comprises an indicator generation unit for defining functions, comparative targets, and predetermined comparison periods, thus generating indicators, wherein the mutual comparison condition strategy establishment unit establishes strategies using the indicators generated by the indicator generation unit.

In another embodiment, a strategy establishment device comprises: a mutual comparison condition strategy establishment unit for setting comparison conditions between price, indicators, and oscillators and then establishing a plurality of mutual comparison condition strategies; a signal generation strategy establishment unit for combining the plurality of mutual comparison condition strategies established by the mutual comparison condition strategy establishment unit, thus establishing a plurality of signal generation strategies; and a strategy establishment unit for combining the plurality of signal generation strategies established by the signal generation strategy establishment unit, thus establishing trading strategies.

In one aspect, the trading market provision system as set forth above further comprises a binder strategy establishment unit for combining the plurality of mutual comparison condition strategies established by the mutual comparison condition strategy establishment unit, thus establishing a plurality of binder strategies.

In yet another aspect, the trading market provision system as set forth above further comprises: a movement strategy establishment unit for defining conditions related to movements, appearing during a predetermined comparison period, for a comparative target, thus establishing movement strategies; a template generation unit for setting functions, comparative targets, and predetermined comparison periods, thus generating a plurality of templates; and a time strategy establishment unit for combining the plurality of mutual comparison condition strategies established by the mutual comparison condition strategy establishment unit, the plurality of movement strategies established by the movement strategy establishment unit, and the plurality of templates generated by the template generation unit, thus establishing time strategies, wherein the strategy establishment unit combines the time strategies established by the time strategy establishment unit, thus establishing the trading strategies, and wherein the signal generation strategy establishment unit combines the time strategies established by the time strategy establishment unit, thus establishing signal generation strategies.

In one aspect of the trading market provision system as set forth above, the conditions set by the movement strategy establishment unit comprise at least one of a vertical range, a horizontal range, a change range, and an average change.

In still another aspect, the trading market provision system as set forth above further comprises a value setting unit for setting values by defining functions, comparative targets, and predetermined comparison periods, or setting values based on whether the signal generation strategies established by the signal generation strategy establishment unit have been fulfilled, wherein the mutual comparison condition strategy establishment unit establishes the mutual comparison condition strategies using the values set by the value setting unit, the movement strategy establishment unit establishes the movement strategies using the values set by the value setting unit, and the template generation unit sets the templates using the values set by the value setting unit.

In yet another aspect, the trading market provision system as set forth above further comprises an option strategy establishment unit for combining maximum slippage (MaxSlippage), maximum spread (MaxSpread), strategy activation time, and a reverse function, thus establishing option strategies; and a fund management strategy establishment unit for establishing fund management strategies required to determine available funds from among holding funds, wherein the strategy establishment unit combines the option strategies established by the option strategy establishment unit and the fund management strategies established by the fund management strategy establishment unit with the established trading strategies.

In still another aspect, the trading market provision system as set forth above further comprises an indicator generation unit for defining functions, comparative targets, and predetermined comparison periods, thus generating indicators, wherein the mutual comparison condition strategy establishment unit establishes strategies using the indicators generated by the indicator generation unit.

In one aspect of the trading market provision system as set forth above, the indicator generation unit displays the generated indicators in a form of a specific chart or provides the indicators as a separate chart. In another aspect of the trading market provision system as set forth above, the indicator generation unit displays the generated indicators in the chart as a plurality of indictors. In yet another aspect of the trading market provision system as set forth above, the trading strategies established by the strategy establishment unit comprise one or more of a buy open strategy, a buy close strategy, a sell open strategy, and a sell close strategy. In still another aspect of the trading market provision system as set forth above, the signal generation strategy establishment unit combines the mutual comparison condition strategies using an AND connection or an OR connection, and assigns weights to combined results. In one aspect of the trading market provision system as set forth above, the mutual comparison conditions set by the mutual comparison condition strategy establishment unit correspond to any one of conditions of being greater than, less than, equal to, and crossing a reference value.

In yet another embodiment, a trading market provision method using synthesis of instruments comprises: (A) a synthesis unit providing an instrument synthesis screen and a ratio selection screen to a user terminal over a communication network, and receiving selected instruments, selected items, and a synthesis ratio from the user terminal, and forming a synthetic group composed of individual items, each having a minimum quantity; (B) a synthetic price calculation unit forming a synthetic price for the synthetic group formed by the synthesis unit, receiving real-time prices of the respective items that form the synthetic group from a securities/futures computerization agency, and calculating a change in the synthetic price of the synthetic group; and (C) a display unit displaying the change in the synthetic price calculated by the synthetic price calculation unit.

In one aspect of the trading market provision system as set forth above, instruments that can be selected by a user using the user terminal from the instrument synthesis screen provided by the synthesis unit comprise at least one of stocks, bonds, futures, options, and currency. In another aspect of the trading market provision system as set forth above, a selection ratio provided by the synthesis unit via the ratio selection screen is a selection ratio based on prices.

In yet another aspect of the trading market provision system as set forth above, the synthetic price calculation unit calculates the synthetic price by calculating converted prices of the respective items using the following equation and adding up calculated converted prices:

converted price=(price(or index)/tick size)*tick value*exchange rate.

In still another aspect, the trading market provision system as set forth above further comprises: (D) when an expiration of an options instrument has been reached, the synthesis unit causing trading of the options instrument to exit and deleting the options instrument from the synthetic group; and (E) automatically rolling over a futures instrument and other expired instruments as outstanding objects, thus enabling the synthetic group to be maintained. In yet another aspect, the trading market provision system as set forth above further comprises: (F) a strategy establishment device receiving a strategy required to determine a trading time for the synthetic group calculated by the synthesis unit from the user via the user terminal and then establishing trading strategies; (G) a strategy execution unit conducting virtual trading for the synthetic group depending on the strategies established by the strategy establishment device and calculating profits based on the virtual trading; and (H) the display unit displaying the profits calculated when the strategy execution unit executes the strategies. In another aspect, the trading market provision system as set forth above further comprises: (I) a report provision unit providing results of virtual trading conducted by the strategy execution unit in a format of a report.

In one aspect of the trading market provision system as set forth above, the report provision unit provides a report which includes at least one of a drawdown, a drawdown percentage, a trading profit, a trading profit percentage, a number of successive profits, successive profits, a number of successive losses, and successive losses, which are calculated by regarding an opening price of each candle in a candlestick chart as an entry point and regarding a closing price of the candle as an exit point in relation to results of virtual trading conducted by the strategy execution unit.

In yet another aspect, the trading market provision system as set forth above further comprises: (J) the strategy execution unit calculating and providing technical indicators for the profits.

In one aspect of the trading market provision system as set forth above, the strategy execution unit provides technical indicators for different time frames so that they overlap with each other when calculating and providing the technical indicators for the profits.

In another aspect, the trading market provision system as set forth above further comprises: (K) the strategy execution unit executing strategies based on a plurality of strategies, and providing a total profit, obtained by adding up results of the execution, by displaying the total profit on the display unit.

In one aspect of the trading market provision system as set forth above, the display unit displays results of virtual trading conducted by the strategy execution unit in a form of a candlestick chart.

In one aspect, the trading market provision system as set forth above further comprises: (L) a trading support unit receiving a trading request for the synthetic group from the user via the user terminal and conducting trading. In yet another aspect, the trading market provision system as set forth above further comprises: (M) a report provision unit providing results of trading conducted by the trading support unit in a format of a report. In another aspect, the trading market provision system as set forth above further comprises: (N) a correlation calculation unit calculating and providing correlations between synthetic prices of synthetic groups calculated by the synthetic price calculation unit.

In still another embodiment, a trading market provision system comprises: a strategy establishment device for receiving strategies required to determine a trading time for a single instrument from a user via a user terminal, thus establishing trading strategies; a strategy execution unit for conducting virtual trading for the single instrument depending on the strategies established by the strategy establishment device and calculating profits based on the virtual trading; and a display unit for displaying the profits calculated when the strategy execution unit conducts the virtual trading.

In one aspect of the trading market provision system as set forth above, the strategy execution unit calculates and provides technical indicators for the profits. In another aspect of the trading market provision system as set forth above, the display unit displays results of the virtual trading conducted by the strategy execution unit in a form of a candlestick chart.

In another embodiment, a trading market provision method comprises: (A) a strategy establishment device receiving strategies required to determine a trading time for a single instrument from a user via a user terminal, thus establishing trading strategies; (B) a strategy execution unit conducting virtual trading for the single instrument depending on the strategies established by the strategy establishment device and calculating profits based on the virtual trading; and (C) a display unit displaying the profits calculated when the strategy execution unit conducts the virtual trading. In one aspect, the trading market provision system as set forth above further comprises: (D) the strategy execution unit calculating and providing technical indicators for the profits.

BRIEF DESCRIPTION OF THE DRAWINGS

FIG. 4 is a diagram showing an example of a synthetic screen provided by the synthesis unit of FIG. 2;

FIG. 5 is a diagram showing an example of a ratio selection screen provided by the synthesis unit of FIG. 2;

FIGS. 14 to 26 are diagrams illustrating examples of various screens used in the present invention and provided to a user.

DESCRIPTION OF THE PREFERRED EMBODIMENTS

Figure 1:
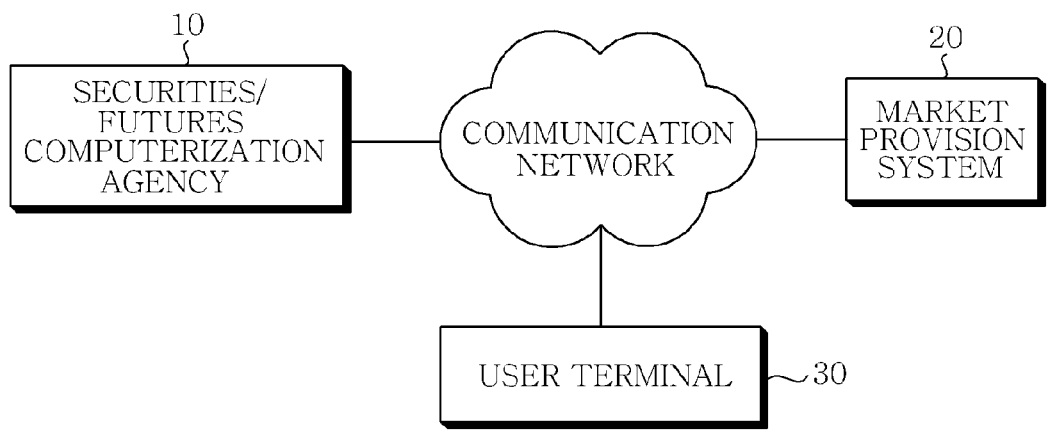
FIG. 1 is a diagram showing the configuration of a network including a trading market provision system using the synthesis of instruments according to a first embodiment of the present invention.

The above and other objects, specific advantages and new features of the present invention will be more clearly understood from the following detailed description taken in conjunction with the accompanying drawings. Reference now should be made to the drawings, in which the same reference numerals are used throughout the different drawings to designate the same or similar components. Further, in the description of the present invention, if detailed descriptions of related well-known constructions or functions have been determined to make the gist of the present invention unclear, the detailed descriptions will be omitted.

Hereinafter, preferred embodiments of the present invention will be described in detail with reference to the attached drawings.

Figure 2:
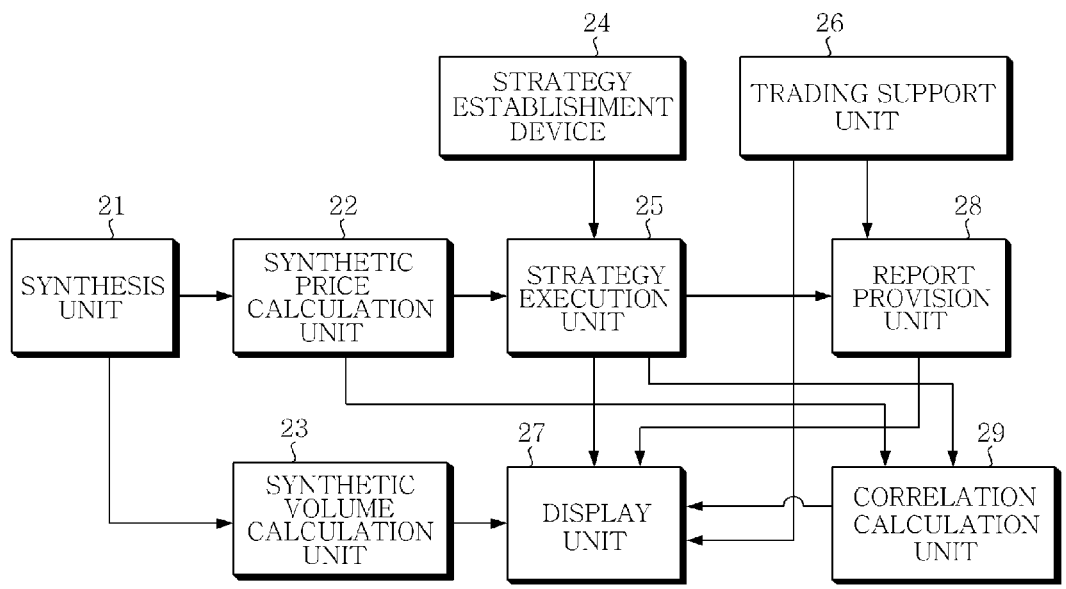
FIG. 2 is a block diagram showing the trading market provision system using the synthesis of instruments according to the first embodiment of the present invention.
Figure 3:
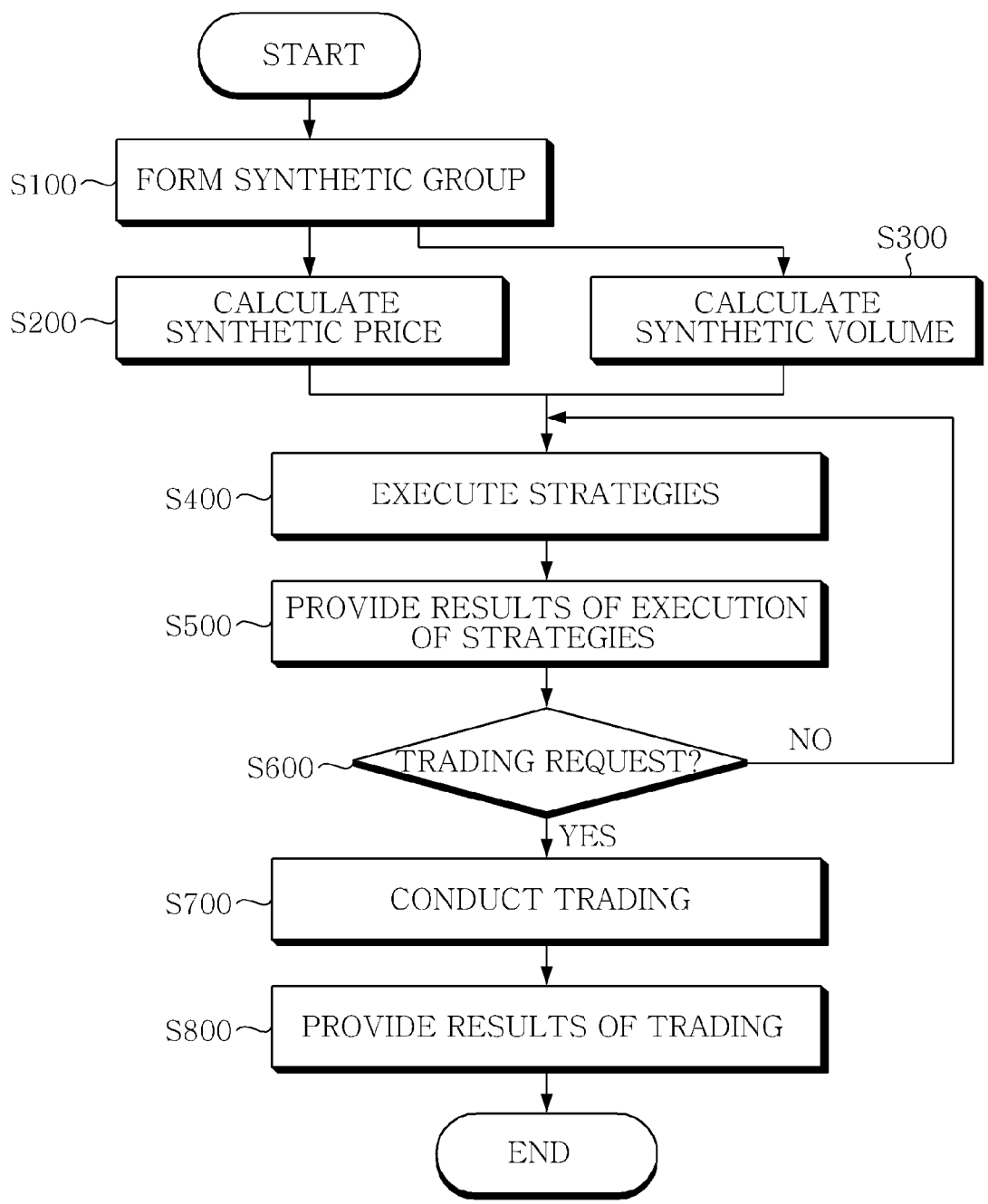
FIG. 3 is a flowchart showing a trading market provision method using the synthesis of instruments according to a first embodiment of the present invention.

FIG. 1 is a diagram showing the configuration of a network including a trading market provision system using the synthesis of instruments according to a first embodiment of the present invention, FIG. 2 is a block diagram showing the trading market provision system using the synthesis of instruments according to the first embodiment of the present invention, and FIG. 3 is a flowchart showing a trading market provision method using the synthesis of instruments according to a first embodiment of the present invention. Hereinafter, the present invention will be described in detail with reference to FIGS. 1 to 3, and other supplementary drawings will be used to describe the present invention if necessary.

Referring to FIG. 1, a network including a trading market provision system using the synthesis of instruments according to a first embodiment of the present invention includes a securities/features computerization agency 10, a trading market provision system 20 using the synthesis of instruments (hereinafter briefly referred to as a "market provision system"), and a client terminal 30.

The securities/futures computerization agency 10 provides the present conditions of actual stock trading and futures trading. The client terminal 30 receives personal data about each client, transmits the received data to the market provision system 20, inputs sell/buy orders from the client, and receives various types of information provided by the market provision system 20.

The market provision system 20 stores the personal data about and trading details of the client, opens a securities account or a futures account using the personal data about the client, transmits data about the account to the client, includes a separate HTS program working in conjunction with the present conditions of the actual stock trading and futures trading of the securities/futures computerization agency 10, allows stocks to be traded in conjunction with the present conditions of the actual stock trading in the securities/futures computerization agency 10 or futures to be traded in relation with the present conditions of futures trading, and fills sell/buy orders within the range of a limit of actual volume if sell or buy orders are made by members. In this case, when the sell/buy orders of individual members are less than or greater than an actual volume, the orders falling within the actual volume are sequentially filled and the remaining orders are accumulated and incorporated into subsequent trading or, alternatively, orders in quantity corresponding to the actual volume are virtually filled for each member and the orders corresponding to the remaining quantity are individually accumulated and incorporated into subsequent trading.

Further, the market provision system 20 allows each member to select and synthesize various instrument items, such as stocks, bonds, currency, futures, and options, and to make a virtual investment depending on various investment strategies that are set for a group of synthetic items (synthesized instruments). Then, the market provision system 20 provides the results of the progress of the virtual investment to the relevant user via the user terminal 30 in the form of highly-readable graphs including candlesticks or bars, thus allowing the user to make an investment with reference to the provided graphs or the like, and also allowing actual trading to be conducted when an actual trading request is received.

Further, the market provision system 20 provides the synthesis of volumes together with the synthesis of prices for the group of synthetic items, and then allows the user to easily grasp the volume of the group of synthesized items and to conduct the desired trading.

As shown in FIG. 2, such a market provision system 20 includes a synthesis unit 21, a synthetic price calculation unit 22, a synthetic volume calculation unit 23, a strategy establishment device 24 a strategy execution unit 25, a trading support unit 26, a display unit 27, and a report provision unit 28.

The synthesis unit 21 provides the user terminal 30 with an instrument synthesis screen illustrated in FIG. 4 and a ratio selection screen illustrated in FIG. 5, thus allowing the user to select desired stocks, bonds, options or futures and to form a synthetic group (S100 in FIG. 3).

Here, the instrument synthesis screen includes a country select box 21*a* for enabling a domestic or international instrument (wherein the integration of domestic and international instruments is also possible) to be selected, an instrument type select box 21*b*, an item select box 21*c* for enabling items to be selected from the selected instrument type, and a trade type select box 21*d* for enabling a type of trade such as buy or sell to be selected.

The user can select "domestic" or "international" using the country select box 21*a* while viewing the instrument synthesis screen.

The user selects the type of instrument using the instrument type select box 21*b* while viewing the instrument synthesis screen. In this case, types of instrument that can be selected may include stocks, bonds, options, currency, and futures. In FIG. 4, stocks and futures are exemplified as the selected types of instrument.

Further, the user can select items using the item select box 21*c* while viewing the instrument synthesis screen. Examples of selectable items include Samsung electronics, Shinhan financial group, etc. in the case of stocks, and examples of bonds include a variety of national bonds. Examples of options include the Korean Composite Stock Price Index (KOSPI) 200 put and call options, examples of futures include KOSPI 200 futures, and examples of currency include dollar, Euro, pound, etc. In FIG. 4, Samsung electronics and Shinhan financial group are exemplified as the selected items of stocks, and KOSPI 200 futures are exemplified as the selected item of futures.

The user may select the type of trade for the selected item using the trade type select box 21*d* on the instrument synthesis screen, wherein buy and sell may be selected in the case of stocks. Here, selecting 'sell' is intended to enable short stock selling or loan transactions to be conducted.

In addition, in the case of bonds, options, currency or futures, sell and buy may be selected. In FIG. 4, as an example, buy is selected in the case of Samsung electronics, sell is selected in the case of Shinhan financial group, and sell is also selected in the case of KOSPI 200 futures.

In this way, when the synthesis unit 21 allows the user to select instrument types, items, and trade types using the instrument synthesis screen, it shows tick sizes and tick values to the user. Here, with regard to financial instruments requiring a margin (in the case of the illustrated example, KOSPI 200 futures), a margin based on the margin rate is shown.

The term "tick size" denotes a minimum unit in which a price can rise or fall in a trade, and the term "tick value" denotes the price that is actually varying at that time.

In stock markets, the tick size and tick value are identical to each other, but in the remaining markets for futures, options, currency, etc., the tick size and tick value may not be identical to each other.

As an example, as shown in FIG. 4, the minimum unit, in which a sell order or a buy order can be made for Samsung electronics while the price is rising or falling, is 1,000, and thus the stock price may vary in increments of 1,000 Won.

Furthermore, in the same manner, the minimum unit, in which a sell order or a buy order can be made for Shinhan financial group while the price is rising or falling, is 500, and thus the stock price may vary in increments of 500 Won. In this way, the tick size and tick value in stock markets are identical.

However, in the case of KOSPI 200 futures, the tick size is 0.05, and the amount of cash varying as the tick size is varying by 0.05 is 25,000, so that tick size and tick value are different from each other.

Meanwhile, the synthesis unit 21 provides the ratio selection screen of FIG. 5 allowing a ratio to be selected so as to form a synthetic group once the types of instruments and the items have been selected by the user.

The user can designate the ratio of the selected items using the ratio selection screen provided by the synthesis unit 21.

For example, if Samsung electronics and Shinhan financial group are selected as stock items, and KOSPI 200 is selected as a futures item, the ratio of the items may be selected as 2:1:2.

In this way, if the ratio has been selected, the synthesis unit 21 sets a minimum quantity of each item according to the selected ratio. For this operation, the synthesis unit 21 can designate a minimum quantity on the basis of the item having the highest price among the selected items. In the case of items requiring margins, the minimum quantity is designated based on the margins. For example, as described above, when the ratio of Samsung electronics, Shinhan financial group and KOSPI 200 futures is 2:1:2, KOSPI 200 futures require a margin of 12,500,000 which is a largest sum of money for this trading, so that KOSPI 200 futures are set to one contract. When the stock price of Samsung electronics is assumed to be 800,000 Won, 15 shares are included in the synthetic group. When the stock price of Shinhan financial group is assumed to be 40,000 Won, 156 shares are included in the synthetic group. In this case, when the number of futures contracts or the quantity of stocks is not determined to be an integer, a predetermined margin is set and then the number or the quantity can be suitably adjusted using an upper or lower limit.

Here, the reason for the synthesis unit 21 to designate the minimum quantity of each item according to the selected ratio when the ratio is selected is to treat the synthetic group as a single individual instrument and present it to the user as such. When the synthetic group is treated as a single (individual) instrument in this way, trading can be easily conducted and the movement of the price can be easily detected, thus obtaining the advantage of allowing the user to efficiently establish or execute strategies.

When the ratio is selected by the user, the synthesis unit 21 can schematize the selected ratio using a diagram or the like, and can also schematize the selected ratio in the form of various graphs using bar graphs or the like.

Here, the synthesis unit 21 forms the synthetic group by designating the ratio and including a minimum quantity of each item in the synthetic group according to the designated ratio, thus implementing a plurality of items as a single instrument. However, unlike this method, it is possible to designate the quantity of each item or the number of contracts and then set the ratio of synthesis according to the designated quantity or number and show it to the user.

For example, in the case where the ratio of Samsung electronics, Shinhan financial group, and KOSPI 200 futures is set to 2:1:2, if the quantity of stocks of Samsung electronics is set to 15, the quantity of stocks of Shinhan financial group is set to 156, and KOSPI 200 futures are set to 1 contract, the ratio 2:1:2 may be calculated and shown to the user. When the calculated ratio is adjusted, the quantity of stocks or the number of contracts may be varied.

Next, the synthetic price calculation unit 22 calculates a synthetic price depending on the instruments selected by the synthesis unit 21, the items of the instruments, and the ratio of the items (S200 in FIG. 3).

Upon calculating the synthetic price, the synthetic price calculation unit 22 calculates the converted prices of respective items by using the following Equation and calculates an arithmetic mean of the converted prices, thus obtaining the synthetic price. With regard to an item having a margin, the synthetic price is calculated based on the actual unit price of the item rather than based on the margin (for example, in the case of KOSPI 200 futures, the synthetic price is calculated based on the price rather than the margin).

$$\text{converted price} = (\text{price (or index)} / \text{tick size}) * \text{tick value} * \text{exchange rate}$$

For example, when the stock price of Samsung electronics is 800,000 Won, the tick size thereof is 1,000 Won, and the tick value thereof is 1,000 Won, the converted price becomes 800,000 Won.

When the index of KOSPI 200 futures is 254.20, the tick size thereof is 0.05, and the tick value thereof is 25,000 Won, the converted price becomes 127,100,000 Won.

In the case of the Euro/dollar index, if the index is 1.37470, the tick size thereof is 0.00001 and the tick value thereof is 1, the converted price becomes 137,470 dollars.

If the converted prices have been calculated in this way, the synthetic price calculation unit 22 calculates the synthetic price by multiplying converted prices calculated for the respective items by quantities and adding up the multiplied results.

Of course, the synthetic price calculation unit 22 may normalize the calculated synthetic price for the convenience of the user.

Meanwhile, since the prices or indices of respective items fluctuate in real time, the synthetic price calculated by the synthetic price calculation unit 22 also fluctuates in real time.

The synthetic price calculation unit 22 calculates the synthetic price fluctuating in real time in this way with reference to real-time prices received from the securities/futures computerization agency 10, and provides the calculated synthetic price, which can be provided via the display unit 27 in the form of a graph.

Figure 6:
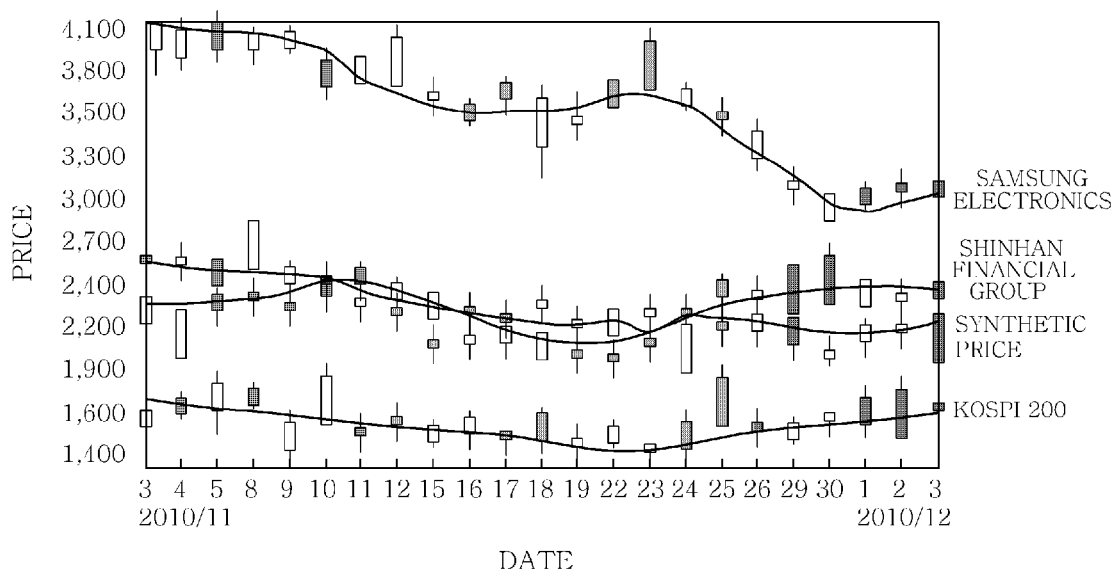
FIG. 6 is a graph showing synthetic prices calculated by the synthetic price calculation unit of FIG. 2.

In this case, the conversion graph of the synthetic price that can be provided by the synthetic price calculation unit 22 to the user via the display unit 27 is provided in the same manner as a single normal instrument in the form of a candlestick/bar chart. An example of this chart is shown in FIG. 6. When the synthetic price is displayed in the form of candlesticks or bars that are familiar to the user and that have high readability, the user can easily detect variations in the synthetic price in real time and can initiate trading at the desired trading time.

This is the reverse of the concept wherein an existing portfolio is formed in relation to funds and trading is conducted, and exhibits a distinction in that a portfolio having the minimum unit is configured and implemented as a single instrument and then entry and exit can be freely performed by technical analysis in markets which have already been implemented using portfolios.

Of course, since the synthetic price is displayed in the form of candlestick/bar charts as in the case of an existing single instrument, the synthetic price calculation unit 22 can quantify information about the opening price and the closing price of the synthetic price, and thus calculate and provide hundreds of thousands of user technical indicators, such as a moving average, a Relative Strength Index (RSI), and stochastic, using a technical indicator provision unit (not shown).

When such technical indicators are provided, technical indicators obtained for different time frames can be provided simultaneously.

Figure 7:
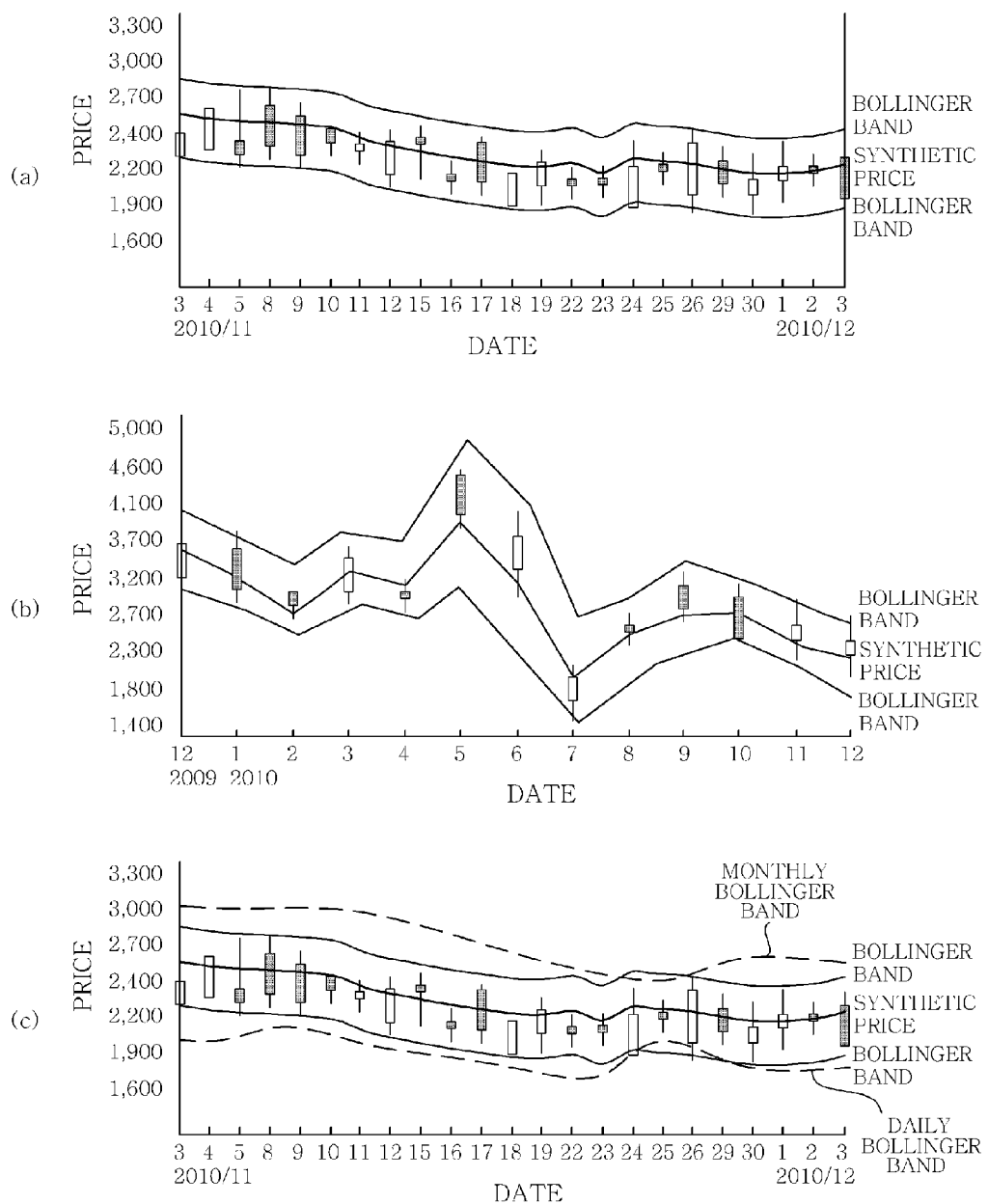
FIGS. 7A to 7C are graphs showing technical indicators applied to the synthetic prices calculated by the synthetic price calculation unit of FIG. 2.
Figure 8:
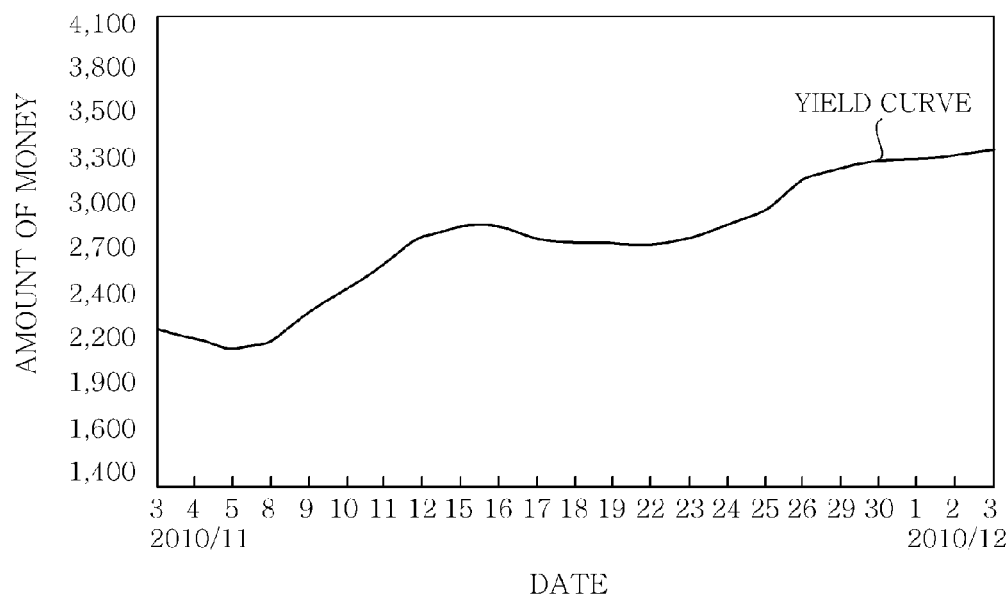
FIG. 8 is a moving average graph showing results based on strategies executed by the strategy execution unit of FIG. 2.

For example, a corresponding period of the bollinger band of a monthly time frame shown in FIG. 7B overlaps with the bollinger band of a daily time frame shown in FIG. 7A, so that a resulting chart may be displayed, as shown in FIG. 7C. In this case, the bollinger band of the monthly time frame seems to be more extended than the bollinger band of the daily time frame.

When technical indicators having different time frames are displayed for the same time frame, the user can simultaneously view the technical indicators in different time bands, thus facilitating the establishment and execution of strategies.

Meanwhile, the synthetic volume calculation unit 23 obtains the rate of change in volume using the moving average of each item belonging to the synthetic group, and calculates and shows total trading volume by adding up the obtained rates of change in volume.

In this case, the total trading volume is calculated by multiplying the rate of change in volume by the ratio of the items when the synthetic volume calculation unit 23 calculates total trading volume for each item belonging to the synthetic group.

For example, in the case of the stocks of Samsung electronics, 1/5 is multiplied by the rate of change in volume. In the case of the stocks of Shinhan financial group, 1/5 is multiplied by the rate of change in volume. In the case of KOSPI 200 futures, 2/5 is multiplied by the rate of change (the above ratio conforms to the initially set ratio).

Of course, the synthetic volume calculation unit 23 may also show the simply added results of volume of individual items belonging to the synthetic group as total trading volume (synthetic volume).

However, the strength of change in relative volume can be easily grasped by the user if the rates of change in continuous volume of a single instrument are added up in relation to the ratio of synthetic items and resulting total trading volume, rather than the simple total trading volume, is shown to the user, thus enabling the tendency of trading to be easily detected (S300 in FIG. 3). This volume synthesis technical indicator is displayed in the form of a chart below the chart of a synthetic instrument market on the display unit 27. Since the volume synthesis technical indicator is also quantified according to the rate, various types of user technical indicators are inserted, thus allowing the movement of volume to be more technically observed.

Next, the strategy establishment device 24 provides a strategy establishment screen to the user so that various types of strategies can be established in the state in which the synthetic price calculated by the synthetic price calculation unit 22 is assumed to be that of a single item, and receives strategies input via the provided strategy establishment screen. Of course, the strategy establishment device 24 can also establish strategies with reference to the synthetic volume calculated by the synthetic volume calculation unit 23.

As an example, the strategy establishment device 24 can receive from the user the strategy of entering the market if the golden cross appears when 20 days moving average of the synthetic price is crossed and of exiting from the market if the death cross appears when the 20 days moving average of the synthetic price is crossed.

As another example of the strategy, the strategy establishment device 24 can establish the strategy of initiating trading at the opening price and maintain stocks on the next day if three up candles appear in the candlestick chart, and of terminating trading at the opening price on the next day if three down candles continuously appear in the candlestick chart.

In this case, the trading strategies have been described based on the death cross and candlestick charts, but trading strategies are not limited to these examples, and it is possible to establish various types of trading strategies.

Meanwhile, if the trading strategies have been established by the strategy establishment device 24, the strategy execution unit 25 virtually conducts trading depending on the established strategies (S400 in FIG. 3). Since automated trading based on strategies has been universalized as prior art, a detailed description thereof is omitted.

For example, when the strategy of the strategy establishment device 24 is set to enter the market on a golden cross and exit from the market on a death cross, the strategy execution unit 25 executes virtual trading depending on the strategy. When the synthetic price varies as the execution of trading occurs, the varying synthetic price is provided to the user using the graph of the trading synthetic price, as shown in FIG. 6, in the name of a 'trading synthetic price' (S500 in FIG. 3).

Figure 9:
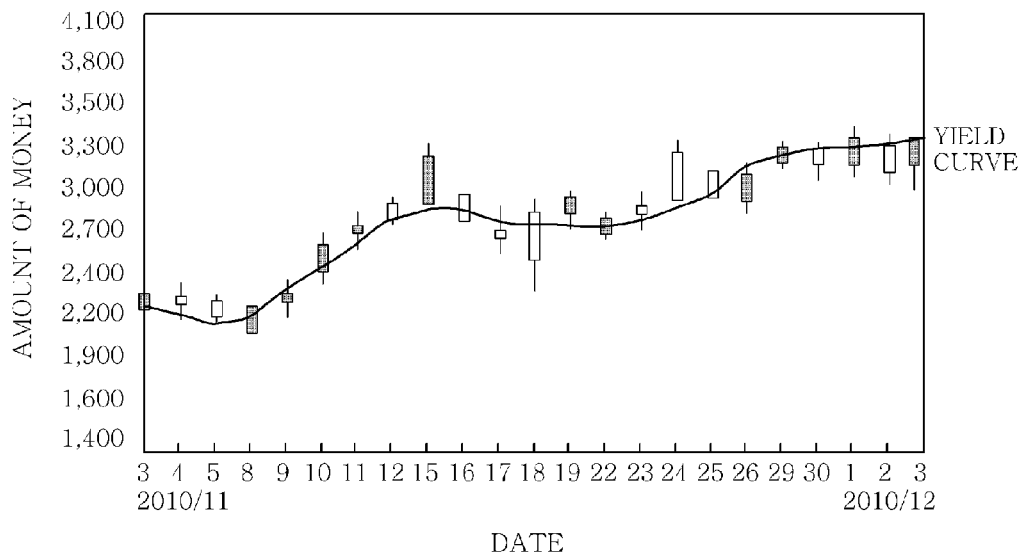
FIG. 9 is a diagram showing an example of a candlestick chart indicating results based on strategies executed by the strategy execution unit of FIG. 2.

Of course, the strategy execution unit 25 may provide the results of the execution of the strategies to the user via the display unit 27 in the form of a candlestick chart, as shown in FIG. 9.

Of course, since the results of the execution of strategies are displayed in the form of a candlestick/bar chart as in the case of an existing single instrument, the display unit 27 may calculate and provide hundreds of thousands of user technical indicators, such as a moving average, an RSI, and stochastic, using a technical indicator provision unit (not shown).

Figure 10:
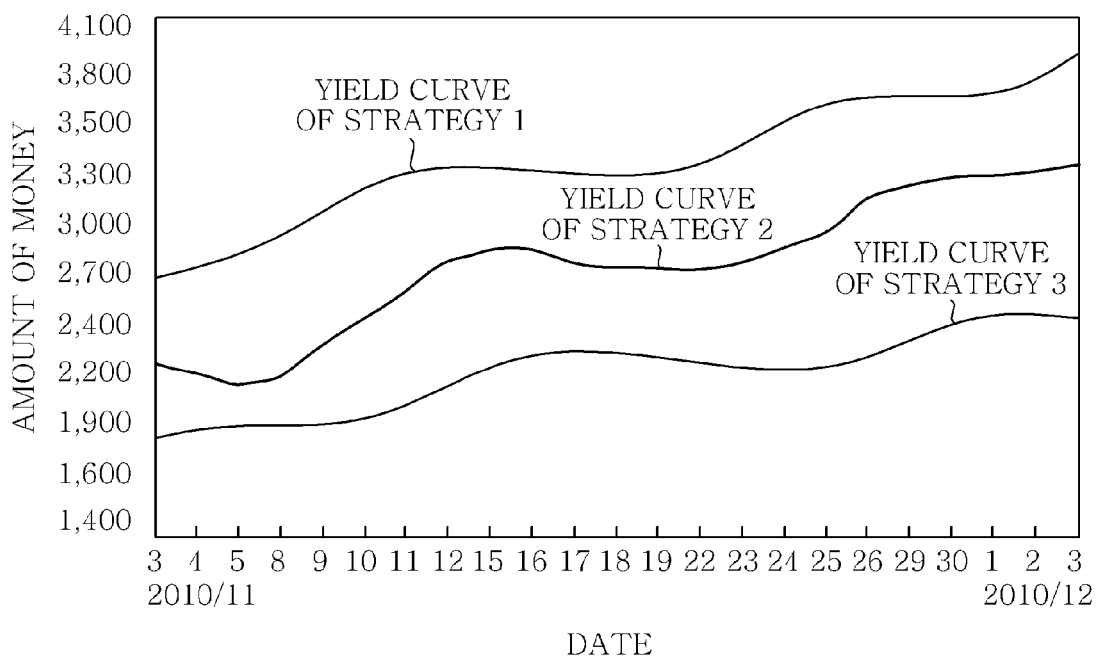
FIG. 10 is a graph showing yield curves based on a plurality of strategies executed by the strategy execution unit of FIG. 2.

Further, the strategy execution unit 25 can execute a plurality of strategies and can display a plurality of results of the executed strategies on a single screen. An example of this case is shown in FIG. 10.

Figure 11:
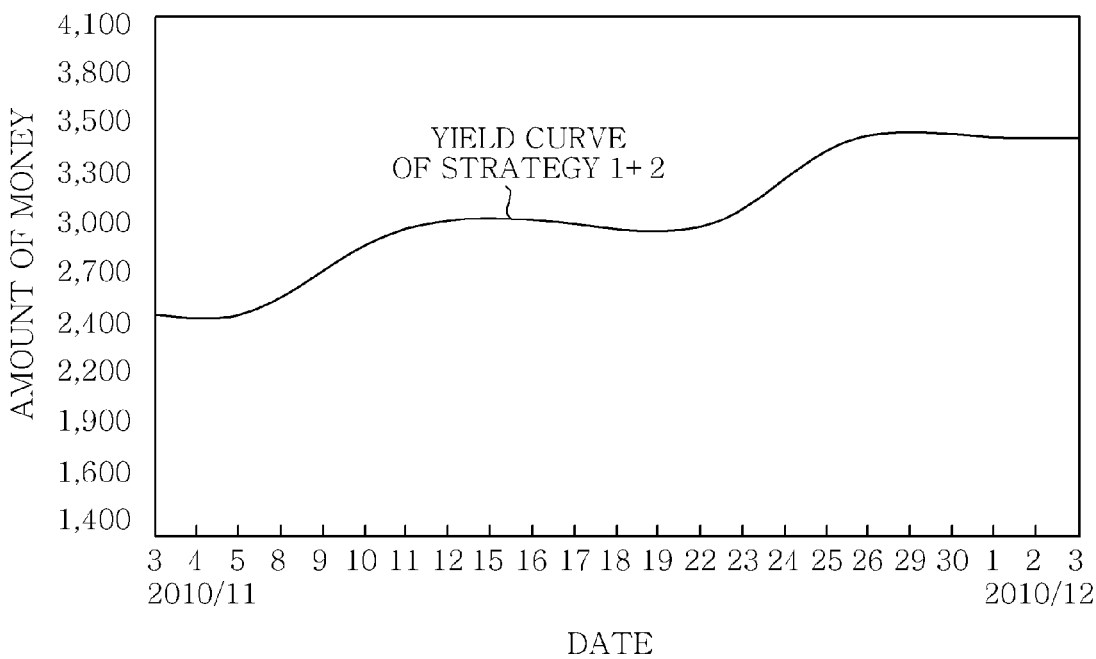
FIG. 11 is a graph showing a synthetic yield curve obtained by synthesizing yield curves based on the plurality of strategies executed by the strategy execution unit of FIG. 2.

Furthermore, the strategy execution unit 25 can execute a plurality of strategies, add up a plurality of results of the executed strategies, and display the added result on a single screen. An example of this case is shown in FIG. 11.

Figure 12:
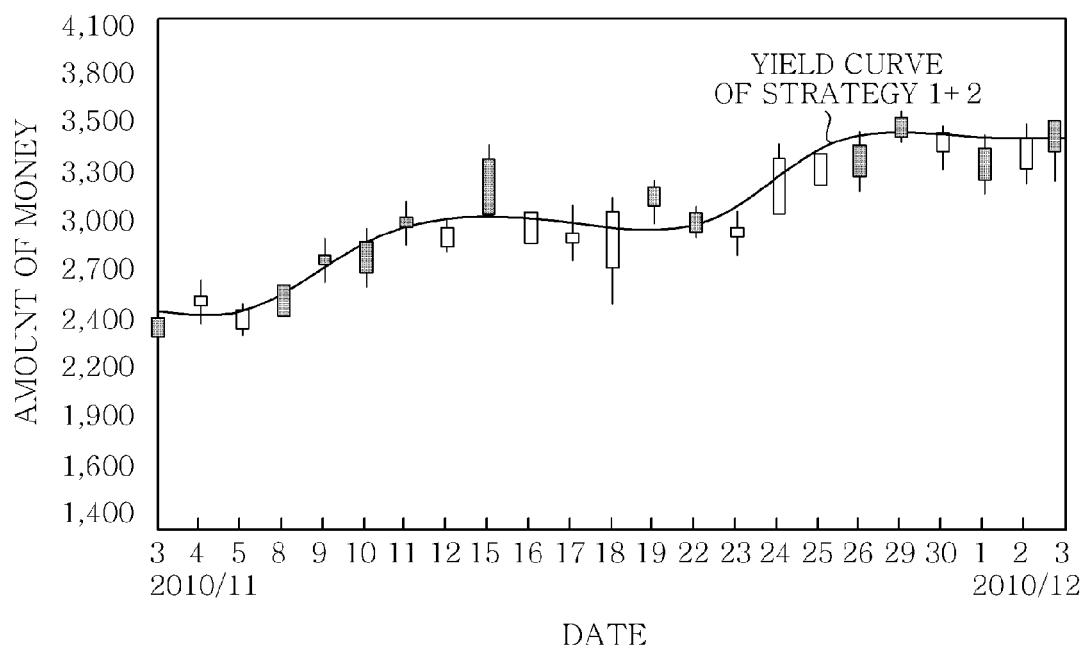
FIG. 12 is a diagram showing an example of a candlestick chart of synthetic yields obtained by synthesizing yield curves based on the plurality of strategies executed by the strategy execution unit of FIG. 2.

In this case, as shown in FIG. 12, when the strategy execution unit 25 executes a plurality of strategies, adds up the results of the executed strategies, and displays the added executed result on a single screen, the candlestick chart or the bar chart is provided, thus improving the visibility of the graph and enabling the technical analysis of the chart using technical indicators to be performed.

When the strategies established by the strategy establishment device 24 are executed by the strategy execution unit 25, the user can initiate trading while monitoring the results of execution based on the established strategies on the display unit 27.

The trading support unit 26 provided in relation to this function is configured such that when a trading request is received from the user via the user terminal 30 (S600 in FIG. 3), trading is conducted on all items included in the synthetic group via the securities/futures computerization agency 10, thus enabling actual trading to be conducted (S700 in FIG. 3).

Of course, the trading support unit 26 may perform trading (system trading) at the automated trading request of the user even if the trading request of the user is not received via the mobile terminal 30.

Such automated trading is set to ON or OFF, so that the existing strategy-based system trading can be activated (ON state)/deactivated (Off state) according to a yield curve. When automated trading is set to "ON", the trading support unit 26 automatically enters into or exits from the market depending on system trading if designated conditions are fulfilled, whereas when automated trading is set to "OFF", the trading support unit 26 does not conduct automated trading based on system trading.

In this case, since system trading is virtually conducted, the chart of the yield curve displayed on the display unit 27 enables the adjustment of whether to set up the entry at an open position if the yield curve contains a position when automated trading is set to "ON". Of course, when automated trading is set to "ON", trade volume can be set in the existing system trading. Since setting automated trading to "OFF" means that system trading is deactivated, whether to exit from the market can be determined if there is an open position.

The trading support unit 26 may make settings in advance so that allowable slippage is left upon trading the items belonging to the synthetic group to smoothly conduct trading (entry both at the market price and at the limit price is possible) and so that when a group of instruments is broken depending on the circumstances of trading upon exiting from the market, the trading support unit 26 selects instruments and forms a new synthetic group or, alternatively, the trading does not occur.

Further, the trading support unit 26 provides details of trading to the user by displaying the results of the conduction of actual trading to the user via the display unit 27.

In this case, the trading support unit 26 provides a room setup function to show the present conditions of accounts corresponding to respective items and possible quantities that are tradable for the respective items.

Further, in the case of futures or the like, the trading support unit 26 provides a gauge function to notify the user that the expiration date is approaching and to also notify the user when a maintenance margin increases or decreases and whether to fill the maintenance margin based on the results of the increase/decrease in the maintenance margin.

The trading support unit 26 may use variations in color so as to notify the user of the expiration date in such a way that notification is provided while color is varying in the sequence of green-yellowish green-yellow-orange-red.

Further, in order to notify the user of the maintenance margin, the trading support unit 26 may notify the user of the maintenance margin after calculating the maintenance margin using the following Equation:

$$N = \text{account balance}/(\text{instrument} * \text{number of contracts} * 1 \text{ tick value})$$

Here, when a value of N falls within a range equal to or less than, for example, 10, the trading support unit 26 indicates the value in a red color, thus providing a warning signal. The warning signal may be implemented to vary in the sequence of green-yellowish green-yellow-orange-red.

Further, the trading support unit 26 shows the minimum price of the synthetic group (in detail, minimum margin+ current spread+commission). Furthermore, when a margin call on the synthetic group is triggered and an intentional change or the closing of a position on an instrument occurs, the trading support unit 26 maintains consistency as a synthetic group based on the margin call and the intentional change or closing of the position on the instrument (indicated on a yield graph/report). The trading support unit 26 stores a new instrument synthesis market in the synthesis unit 21 at the time of storing the changed synthetic group, and then produces the new synthesis market that maintains consistency.

In this case, the synthesis unit 21 may cause an options instrument to exit and automatically disappear from the synthetic group when the options instrument has expired. However, futures and other expired instruments are automatically rolled over as outstanding objects and then the consistency of the synthetic instrument group is maintained (however, the client may set a relevant instrument so that when the instrument has expired, the expired instrument may be deleted from the synthetic group).

Of course, the trading support unit 26 may provide the details of trading in the form of a graph (a candlestick, bar, or broken line graph) via the display unit 27.

Meanwhile, the report provision unit 28 may provide the results obtained by regarding the opening price of each candle, appearing on the chart of an instrument market (single/synthetic), as the entry point and regarding the closing price thereof as the exit point, the results of strategies executed by the strategy execution unit 25 (results obtained based on entry and exit/results obtained by regarding the opening price of each candle on the candlestick or bar chart as the entry point and regarding the closing price thereof as the exit point), or the results of trading conducted by the trading support unit 26 (results obtained based on entry and exit/ results obtained by regarding the opening price of each candle on the candlestick or bar chart as the entry point and regarding the closing price thereof as the exit point), in the format of reports (S800 in FIG. 3). However, reports, obtained when actual trading does not occur, are calculated in such a way that when the time (date) desired by the client is fixed and the type of trade (sell/buy) is set, the results of management reports from that time point are produced.

For example, in the case of stocks, management reports are produced for a single instrument of Samsung electronics by regarding the opening price of each candle, depicted on a chart based on the desired date as a reference point, as the entry point and regarding the closing price thereof as the exit point. Of course, in this case, the results of management reports may be differently produced for individual time frames of charts (a minute chart, a daily chart, etc.). Since individual users have different trade types (position trading/ swing/overnight/day trading/scalping), management reports are produced for respective charts for different time frames, thus improving the convenience of the user in searching for instruments suitable for the trading tendency of the user.

In this case, each report that is provided includes, for example, an amount of the initial deposit, total net profit, a profit and loss factor, net profit, net loss, an expected payment, winning rate at buying, winning rate at selling, the average number of successive profits, average trading profit, the average number of successive losses, average trading loss, etc.

Here, an amount of the initial deposit may be determined based on either the amount of an actual deposit or the amount of a virtual deposit.

Total net profit denotes an amount obtained by subtracting net loss from net profit, a profit and loss factor denotes the ratio obtained by dividing net profit by net loss, and an expected payment denotes an amount of money that will enable a profit to be made on one trade.

Winning rate at buying denotes the percentage of gaining profit in buying trades, and winning rate at selling denotes the percentage of obtaining profit in selling trades.

The average number of successive profits denotes a value obtained by dividing the numbers of times profits are successively gained and calculating their arithmetic mean. Average trading profit denotes a value obtained by dividing the amount of profit by the number of winning trades. The average number of successive losses denotes a value obtained by dividing the numbers of times losses are successively incurred and calculating their arithmetic mean. Average trading loss denotes a value obtained by dividing the amount of loss by the number of losing trades.

Further, the report that is provided includes the maximal drawdown, the maximal drawdown percentage, trading profit per time, trading loss per trade, the number of successive profits, successive profits, the number of successive losses, successive losses, etc.

Maximal drawdown denotes an amount obtained by subtracting the maximal valuation loss from the maximal valuation gain, and maximal drawdown percentage denotes the percentage of a value obtained by dividing such maximal drawdown by the maximal valuation gain.

Further, the number of successive profits denotes the maximal number of times profits are successively gained, and successive profits denote an amount of money obtained from the maximal number of successive profits.

The number of successive losses denotes the maximal number of times losses are successively incurred, and successive losses denote an amount of money obtained from the maximal number of successive losses.

In addition, Minimal Acceptable Return (MAR) index/ Compound Annual Gross Rate (CAGR) %/sharp index/Kelly criterion, etc. based on the report may be calculated by regarding candles in each chart as periods on the basis of charts by which the management report has been produced (in a monthly chart, a month candle may be used to calculate a monthly sharp index).

Of course, management reports based on broken line graphs conforming to entry/exit may be used to calculate MAR index/CAGR %/sharp index/Kelly criterion, etc. by setting periods.

In addition, reports provided by the report provision unit 28 may further include various coefficients or calculated values according to coding performed by the user (the scalability of management reports).

When the reports are provided by the above-described report provision unit 28, trading may be conducted using the calculated values appearing on the reports. The reports provide various types of statistical data as described above from reference date set by the user or the date on which actually trading is initiated. The reports may separately represent an accumulated value (the maximum value) and a current value and may set entry and exit points based on the accumulated value and the current value. Further, the current value represented by the number of times on the display unit 27 is indicated by a broken line on a chart showing the passage of time. Further, the current value represented by an amount of money or rate is indicated by a candlestick/bar/broken line on the chart showing the passage of time. Accordingly, the analytic skills on the management report can be improved, so that trading can be efficiently conducted.

The following Table 1 shows an example of a report provided by the report provision unit 28.

TABLE 1

Management report From: 2010-05-27-12:00

|  | | Accumulated value |
|---|---|---|
| Initial deposit | | $10,000 |
| Total net profit | | $3,237 |
| Profit and loss factor | | 2 |
| Net profit | | $6,476 |
| Net loss | | −$3,238 |
| Expected payment | | $429 |
| Buy | Winning rate | 39.13% |
| Sell | Winning rate | 51.22% |
| Average number of successive profits | | 2 |
| Average trading profit | | $215 |
| Average number of successive losses | | 1 |
| Average trading loss | | −$95 |

| | Max | Current value | Trading entry | Trading exit |
|---|---|---|---|---|
| Maximal drawdown | $1,088 | | | |
| Maximal drawdown (%) | 7.97% | | | |
| Trading profit (per time) | $1,109 | | | |
| Trading loss (per time) | −$500 | | | |
| Number of successive profits | 5 | 0 | | |
| Successive profit | $1,399 | | | 2 |
| Number of successive losses | 6 | 3 | 5 | |
| Successive loss | −$601 | | | |

For example, the user can grasp statistical numerical values corresponding to the maximum number of times losses are successively incurred, and can set entry and exit points. In Table 1 exemplified above, setting may be implemented such that in the case where the maximum number of successive losses is 6, entry into trading is conducted when the number of successive losses is 5, and exit from trading is conducted when the number of successive profits is 2.

Of course, for trading based on such a management report, it is possible to conduct the trading of all (single/synthetic) instruments, to which the reference date is applied, and trading at markets based on strategy yield curves (markets of yield curves indicated based on entry and exit/markets of yield curves in which entry is represented by the opening price of each candle and exit is represented by the closing price of each candle).

In the management report produced by regarding the opening price as the entry point and regarding the closing price as the exit point, profit on the above-described report refers to an up candle, and loss refers to a down candle. In other words, since the number of successive profits and the number of successive losses may be replaced and described by the number of successive up candles and the number of successive down candles, statistical data important for movements on normal charts of individual instruments, as well as yield curves based on strategies, may be provided, thus allowing the user to easily detect statistical movement of the prices of instruments and to conduct trading based on detected statistical movement.

Such entry and exit may be automatically conducted in conjunction with the trading support unit 26.

Meanwhile, the correlation calculation unit 29 obtains and provides correlations between the synthetic prices of synthetic groups, or obtains and provides correlations between yield curves based on different strategies.

Here, correlations that can be provided include a correlation coefficient, a basis, etc.

As an example, the correlation coefficient and the basis shown in the following Table 2 may be provided.

Of course, the user may add other output coefficients exhibiting correlations to the correlation calculation unit 29 using program coding.

TABLE 2

| Market 1 | Market 2 |
|---|---|
| Correlation coefficient | |
| Basis | |

The correlation coefficient or basis calculated above may be implemented as a technical indicator in the form of charts of candlesticks, bars or broken lines via the display unit 27, and facilitates the insertion of technical indicators and the conduction of trading.

Figure 13:
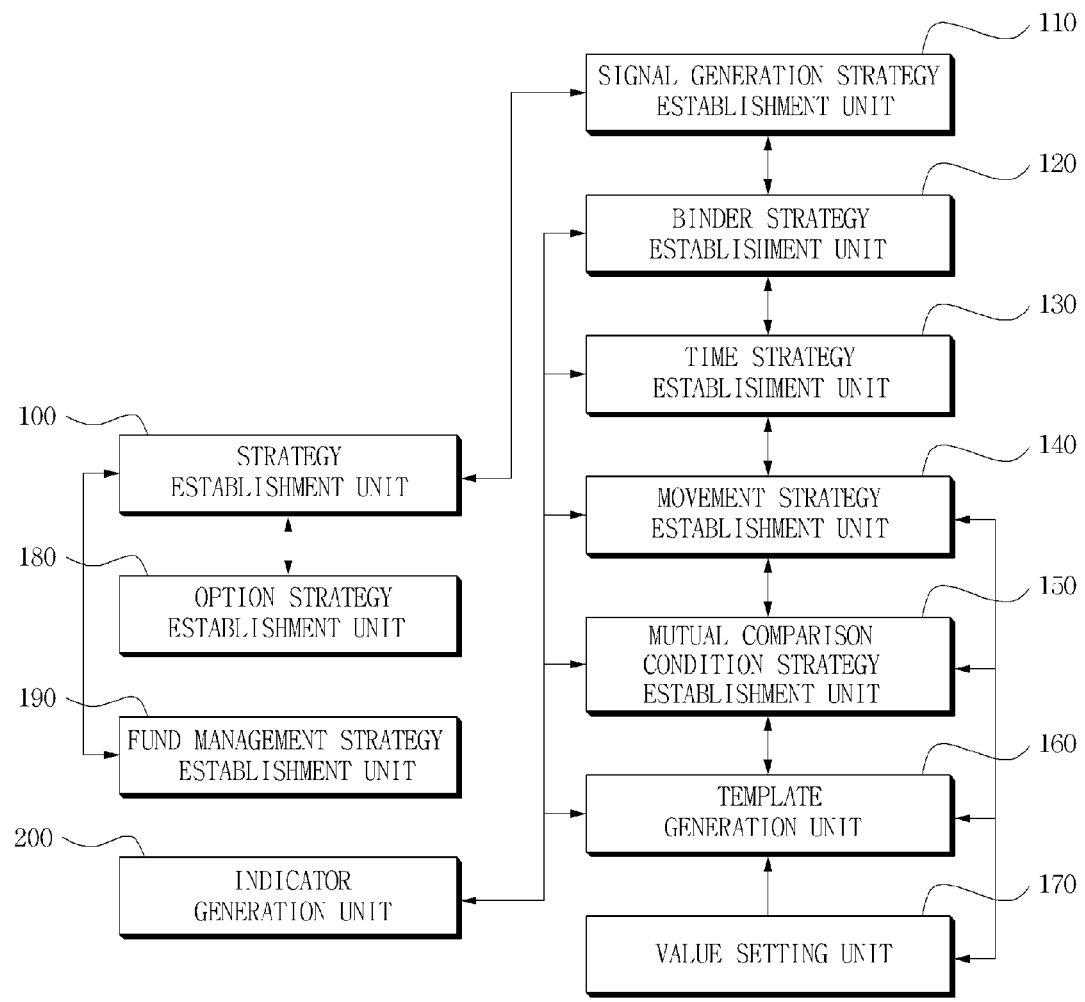
FIG. 13 is a block diagram showing the construction of the strategy establishment device of FIG. 2.

FIG. 13 is a diagram showing the construction of the strategy establishment device of FIG. 1.

Referring to FIG. 13, the strategy establishment device of FIG. 1 includes a strategy establishment unit 100, a signal generation strategy establishment unit 110, a binder strategy establishment unit 120, a time strategy establishment unit 130, a movement strategy establishment unit 140, a mutual comparison condition strategy establishment unit 150, a template generation unit 160, a value setting unit 170, an option strategy establishment unit 180, a fund management strategy establishment unit 190, and an indicator generation unit 200.

The strategy establishment unit 100 establishes trading strategies by combining a plurality of various signal generation strategies, option strategies, and fund management strategies.

In this case, the established trading strategies include a buy open strategy, a buy limit order strategy, a buy stop strategy, a buy reopen strategy, a buy close strategy, a sell open strategy, a sell limit order strategy, a sell stop strategy, a sell reopen strategy, and a sell close strategy.

Figure 14:
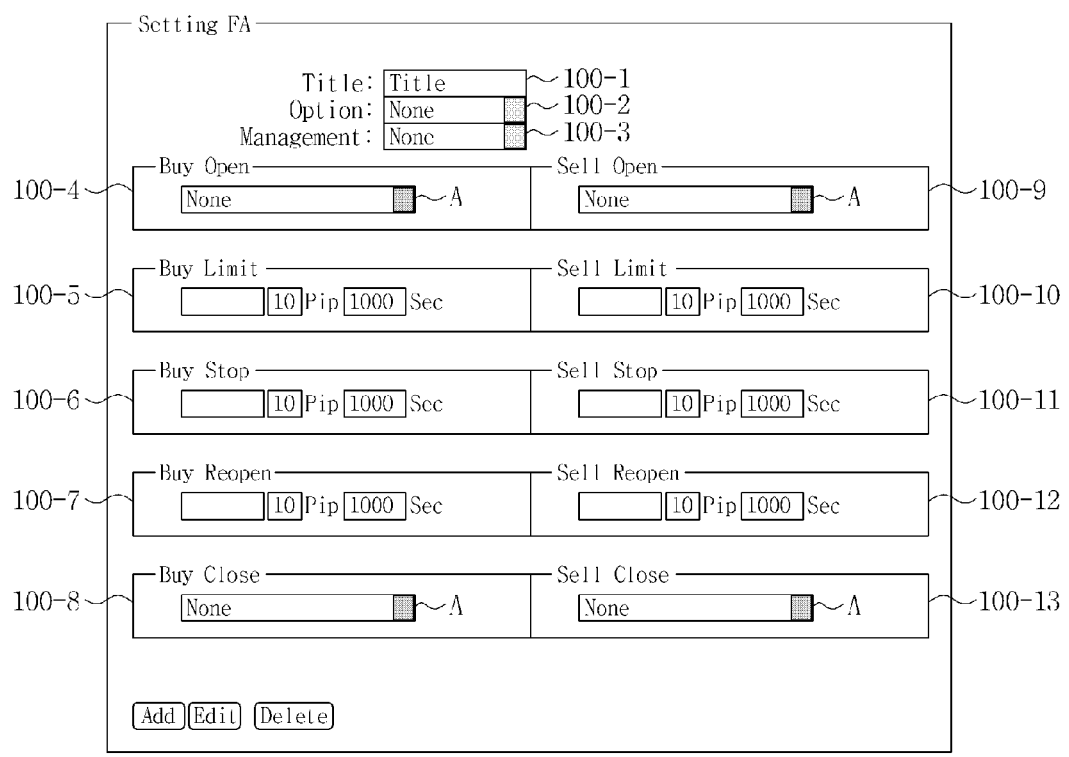

Reference drawing related to these strategies is shown in FIG. 14. As displayed to the user on a display unit (not shown), the strategy establishment unit 100 provides the user with a strategy combination screen that includes a trading strategy title input box 100-1, an option strategy select box 100-2, a fund management strategy select box 100-3, a buy open strategy select window 100-4, a buy limit order select window 100-5, a buy stop select window 100-6, a buy reopen strategy select window 100-7, a buy close strategy select window 100-8, a sell open strategy select window 100-9, a sell limit order select window 100-10, a sell stop select window 100-11, a sell reopen select window 100-12, a sell close strategy select window 100-13, etc.

When the user enters a title into the provided trading strategy title input box 100-1, the strategy establishment unit 100 stores the entered title.

When the user selects an option strategy using the option strategy select box 100-2, the strategy establishment unit 100 stores the selected option strategy.

Further, when the user selects a fund management strategy using the provided fund management strategy select box 100-3, the selected fund management strategy is stored in the strategy establishment unit 100.

Meanwhile, the buy open strategy select window 100-4 on the provided strategy combination screen is implemented as a single sub-window, and allows the user to select a signal generation strategy using an input button A provided on the right side of the sub-window.

Further, the buy limit order selection window 100-5 on the provided strategy combination screen is implemented as a single sub-window, and the user can select a signal generation strategy using an input button A provided on the right side of the sub-window. Here, the term "buy limit order" denotes an order for buying stocks such that in the case where a relevant signal generation strategy is satisfied and the price reaches or exceeds a bid price in a Percentage In Point (pip) at the satisfied value (where the unit of the bid price has been set to a 'pip', but any unit including the unit of money can be used), stocks are bought at the bid price within a time (where the time is designated as, for example, 1,000 sec) displayed in a period input box.

Further, the buy stop select window 100-6 on the provided strategy combination screen is implemented as a single sub-window, and the user may select a signal generation strategy using an input button A provided on the right side of the sub-window. Here, the term "buy stop" denotes an order for buying stocks such that in the case where a relevant signal generation strategy is satisfied and the price reaches a bid price in a pip at the satisfied value (where the unit of the bid price has been set to a 'pip', but any unit including the unit of money can be used), stocks are bought within a time (where the time is designated as, for example, 1,000 sec) displayed in a period input box if the price satisfies or exceeds the bid price.

The buy reopen strategy select window 100-7 on the provided strategy combination screen is implemented as a single sub-window, and the user may select a signal generation strategy using an input button A provided on the right side of the sub-window. Here, the term "buy reopen" denotes the repetitive execution of a buy order.

The buy close strategy select window 100-8 on the provided strategy combination screen is implemented as a single sub-window, and the user may select a signal generation strategy using an input button A provided on the right side of the sub-window.

The sell open strategy select window 100-9 on the provided strategy combination screen is implemented as a single sub-window, and the user may select a signal generation strategy using an input button A provided on the right side of the sub-window.

The sell limit order select window 100-10 on the provided strategy combination screen is implemented as a single sub-window, and the user can select a signal generation strategy using an input button A provided on the right side. Here, the term "sell limit order" denotes an order for selling stocks such that in the case where a relevant signal generation strategy is satisfied, and the price reaches or exceeds an ask price in a pip at the satisfied value (where the unit of the ask price has been set to a 'pip', but any unit including the unit of money can be used), stocks are sold at the ask price within a time (where the time is designated as, for example, 1,000 sec) displayed in a period input box.

The sell stop select window 100-11 on the provided strategy combination screen is implemented as a single sub-window, and the user selects a signal generation strategy using an input button A provided on the right side of the sub-window. Here, the term "sell stop" denotes an order for selling stocks such that in the case where a relevant signal generation strategy is satisfied and the price reaches an ask price in a pip at the satisfied value (where the unit of the ask price has been set to a 'pip', but any unit including the unit of money can be used), stocks are sold at the ask price or less within a time (where the time is designated as, for example, 1,000 sec) displayed in a period input box.

The sell reopen strategy select window 100-12 on the provided strategy combination screen is implemented as a single sub-window, and the user selects a signal generation strategy using an input button A provided on the right side of the sub-window. Here, the term "sell reopen" denotes the repetitive execution of a sell order.

Next, the sell close strategy select window 100-13 on the provided strategy combination screen is implemented as a single sub-window, and the user selects a signal generation strategy using an input button A provided on the right side of the sub-window.

Meanwhile, the signal generation strategy establishment unit 110 establishes the signal generation strategies by combining binder strategies, time strategies, movement strategies, mutual comparison condition strategies, templates, etc.

Figure 15:
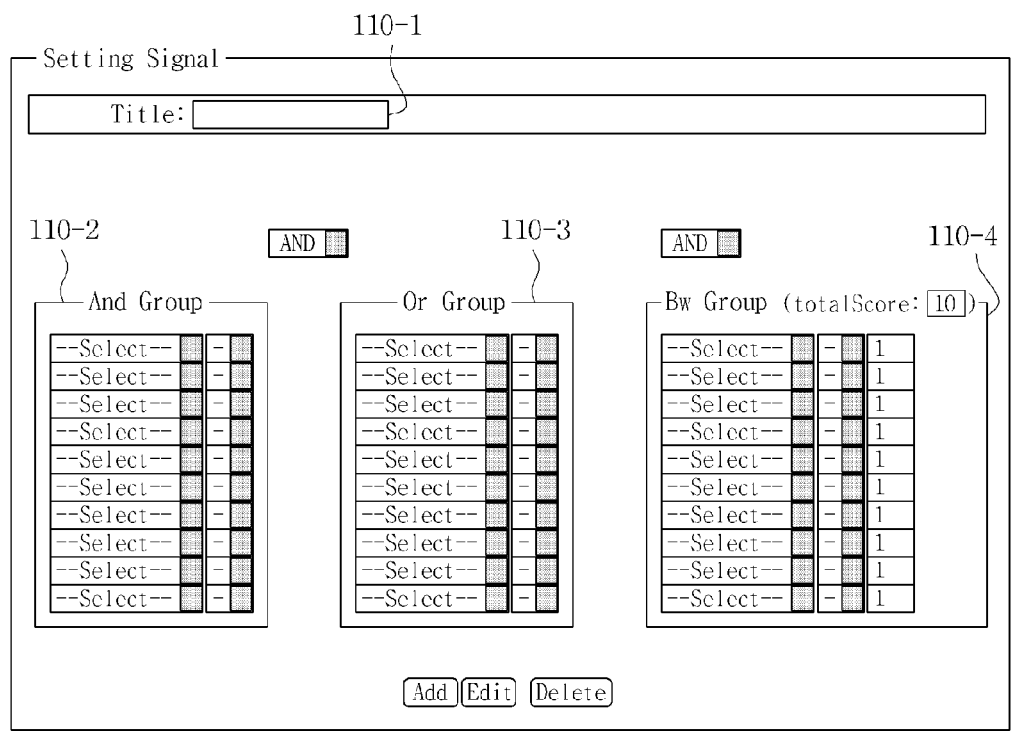

For this operation, as shown in FIG. 15, the signal generation strategy establishment unit 110 provides a signal generation strategy establishment screen to the user. The signal generation strategy establishment screen includes a title input box 110-1, an AND group select window 110-2, an OR group select window 110-3, and a weight select window 110-4.

The user enters a title into the title input box 110-1 on the signal generation strategy establishment screen, and stores the title.

Further, the user selects strategies to belong to an AND group using the AND group select window 110-2 on the signal generation strategy establishment screen, selects strategies to belong to an OR group using the OR group select window 110-3, selects weights using the weight select window 110-4 and then assigns the weights to the strategies.

Here, the term "AND group" denotes conditions simultaneously satisfying relevant conditions, and the term "OR group" denotes conditions causing a sell open signal, a sell close signal, a buy open signal or a buy close signal to be generated if at least one of relevant conditions is satisfied. Here, as conditions that can be selected, AND and OR conditions have been disclosed, but NOT or other conditions can be selected.

Further, the term "weight" denotes values required to determine priorities when comparing those conditions and is set in such a way that when any condition is assumed to be '1', values to which the weights have been applied are added up, and if the added result is equal to or greater than a predetermined value, a given event occurs.

In this configuration, the strategies that can be selected using the AND group select window 110-2 and the OR group select window 110-3 include binder strategies, time strategies, movement strategies, mutual comparison condition strategies, set templates, etc.

Next, the binder strategy establishment unit 120 establishes the binder strategies by combining the time strategies, the movement strategies, the mutual comparison condition strategies, the templates, etc.

Figure 16:
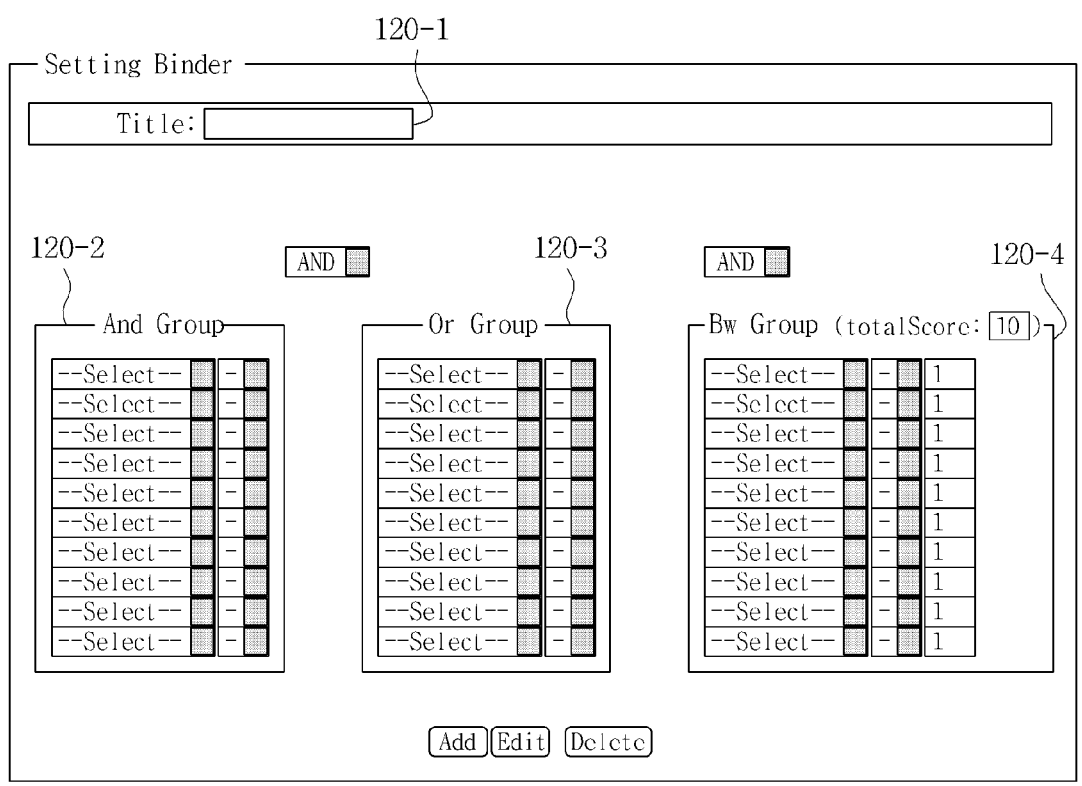

For this operation, as shown in FIG. 16, the binder strategy establishment unit 120 provides the binder strategy establishment screen to the user. The binder strategy establishment screen a title input box 120-1, an AND group select window 120-2, an OR group select window 120-3, and a weight select window 120-4.

The user enters a title into the title input box 120-1 on the binder strategy establishment screen, and stores the title.

Further, the user selects strategies to belong to an AND group using the AND group select window 120-2 on the binder strategy establishment screen, selects strategies to belong to an OR group using the OR group select window 120-3, selects weights using the weight select window 120-4 and then assigns the weights to the strategies.

Here, the term "AND group" denotes conditions simultaneously satisfying relevant conditions, and the term "OR group" denotes conditions causing a sell open signal, a sell close signal, a buy open signal or a buy close signal to be generated if at least one of relevant conditions is satisfied. Here, as conditions that can be selected, AND and OR conditions have been disclosed, but NOT or other conditions can be selected.

Further, the term "weight" denotes values required to determine priorities when comparing those conditions and is set in such a way that when any condition is assumed to be '1', values to which the weights have been applied are added up, and if the added result is equal to or greater than a predetermined value, a given event occurs.

In this configuration, the strategies that can be selected using the AND group select window 120-2 and the OR group select window 120-3 include time strategies, movement strategies, mutual comparison condition strategies, set templates, etc.

The binder strategy establishment unit 120 has the same configuration as the signal generation strategy establishment unit 110 except for functions and the range of selectable strategies. The reason for this is that a duplicated structure is used to improve the convenience of the user when establishing strategies. According to the circumstances, the binder strategy establishment unit 120 may be omitted.

Next, the time strategy establishment unit 130 establishes time strategies by combining movement strategies, mutual comparison condition strategies, set templates, etc.

In this case, the time of the time strategies established by the time strategy establishment unit 130 can be implemented as two modes, that is, a time mode and a candle mode. Here, the term "time mode" denotes a mode in which time conditions are set using a start time and an end time. The term "candle mode" denotes a mode in which time conditions are set using the number of candles in a one-minute candle, a five-minute candle, and a ten-minute candle. In candle mode, the term "number of candles" denotes a period. Here, the term "time conditions" denotes the time at which trading such as buy open, buy close, sell open, or sell close can be conducted.

Figure 17:
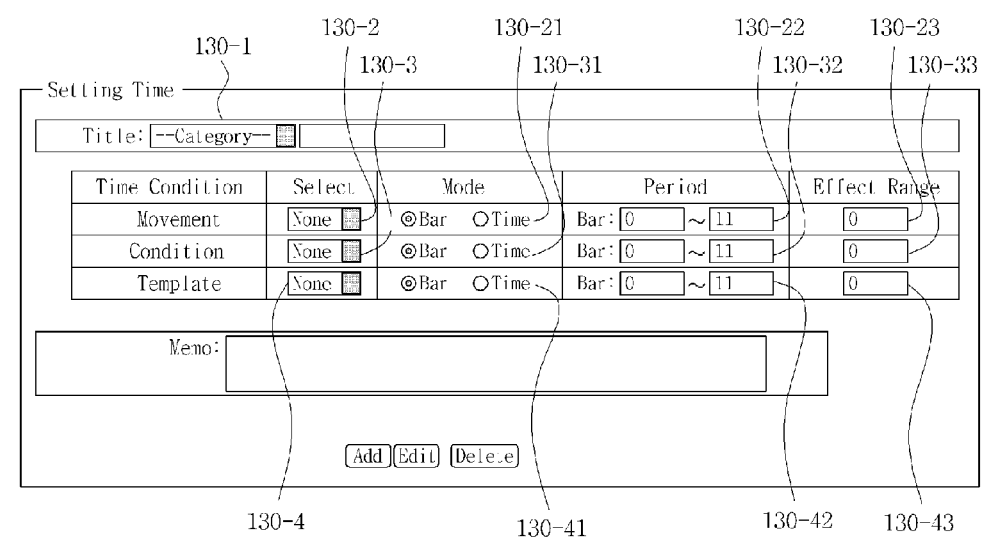

For this operation, the time strategy establishment unit 130 provides, for example, a time strategy establishment screen, as shown in FIG. 17, to the user. The time strategy establishment screen includes a time title input box 130-1, a movement strategy select box 130-2, a mutual comparison condition strategy select box 130-3, a template select box 130-4, mode setting select buttons 130-21, 130-31, and 130-41 for the movement strategy select box 130-2, the mutual comparison condition strategy select box 130-3, and the template select box 130-4, respectively, time select boxes 130-22, 130-32 and 130-42, effective range time select boxes 130-23, 130-33 and 130-43, etc.

The user may set up the title of a time strategy using the title input box 130-1.

Further, the user loads a movement strategy established by the movement strategy establishment unit 140 by clicking the input button in the movement strategy select box 130-2 on the time strategy establishment screen, and then combines the movement strategy with the mutual comparison condition strategy and the template. Of course, the user may not combine the movement strategy with the mutual comparison condition strategy or the like by setting the movement strategy to 'None'.

The user combines the mutual comparison condition strategy established by the mutual comparison condition strategy establishment unit 150 with the movement strategy by clicking the input button in the mutual comparison condition select box 130-3 on the time strategy establishment screen. Of course, the user may not combine the mutual comparison condition strategy with the movement strategy or the template by setting the mutual comparison condition strategy to 'None'.

Further, the user combines the template generated by the template generation unit 160 with the movement strategy and the mutual comparison condition strategy by clicking the input button in the template select box 130-4 on the time strategy establishment screen. Of course, the user may not combine the template with the mutual comparison condition strategy or the movement strategy by setting the template to 'None'.

Further, the user may select a time mode or a candle mode using the mode setting select buttons 130-21, 130-31, and 130-41 for the movement strategy select boxes 130-2, the mutual comparison condition strategy select box 130-3, and the template select box 130-4, respectively, may set the time using the time select boxes 130-22, 130-32, and 130-42, and may set the effective range time using effective range time select boxes 130-23, 130-33, and 130-43.

Meanwhile, the movement strategy establishment unit 140 establishes movement strategies enabling trading such as buy open, buy close, sell open, or sell close to be conducted.

In this case, the term "movement" denotes the directionality of movements formed by stock prices, indicators, currency prices, etc., and refers to a fluctuation in an average movement, a band range, or the like.

Figure 18:
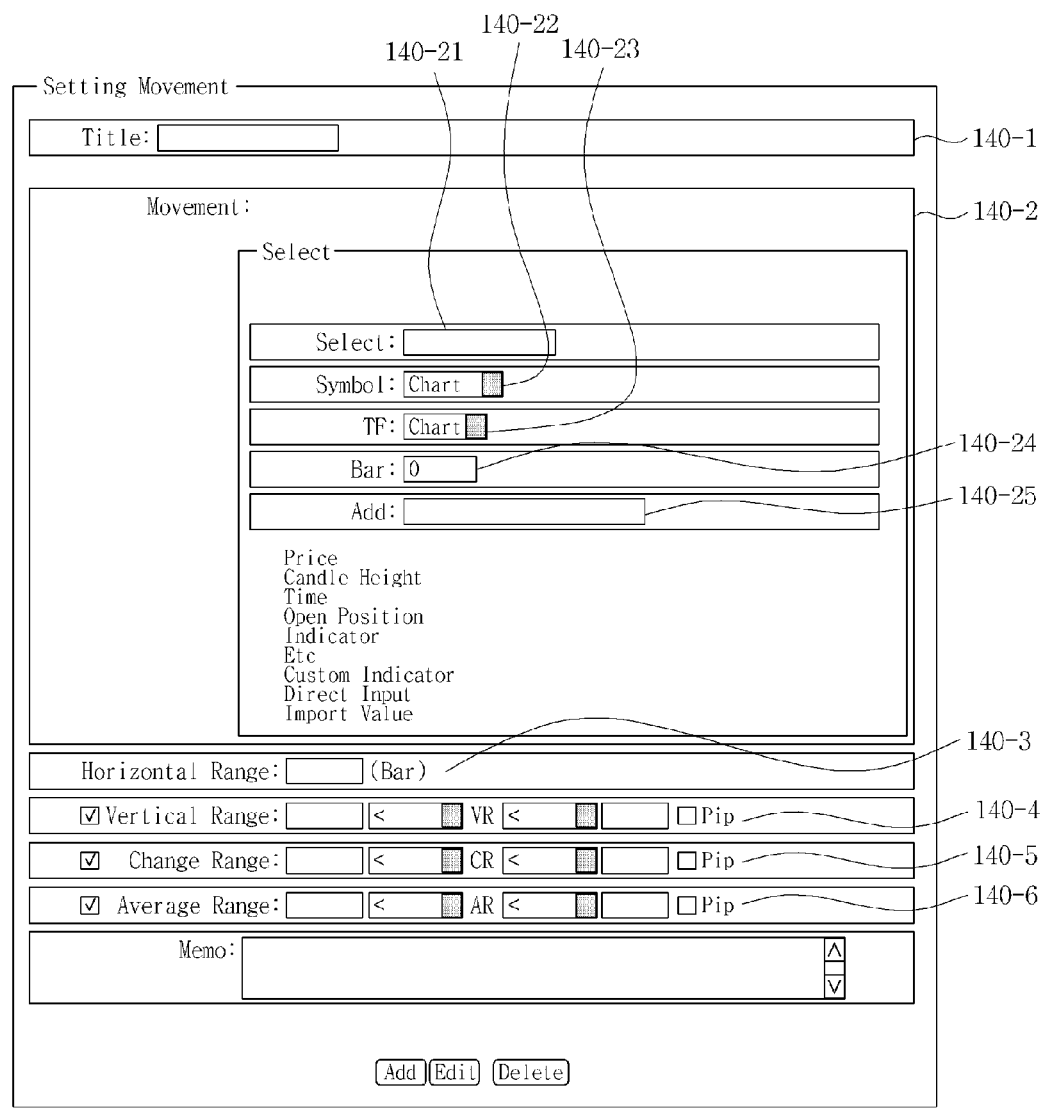

For this operation, the movement strategy establishment unit 140 provides, for example, a movement strategy establishment screen, as shown in FIG. 18, to the user. The provided movement strategy establishment screen includes a movement strategy title input box 140-1, a setting range condition input window 140-2, a horizontal range select box 140-3, a vertical range select box 140-4, a change range select box 140-5, and an average change input box 140-6.

The setting range condition input window 140-2 includes a comparative target select box 140-21, a symbol select box 140-22, a time frame select box 140-23, a comparison period select box 140-24, and an additional calculation value setting box 140-25.

The user designates a title using the title input box 140-1 on the movement strategy establishment screen, and stores the designated title.

Further, the user can select a comparative target related to an item selected from the symbol select box 140-22, for example, the stock price of an individual business or the exchange rate of Euro (EUR)/United States dollar (USD), using the comparative target select box 140-21 of the setting range condition input box 140-2.

In this case, the comparative target that can be selected may be any one selected from among price, candle height, time, open position, an indicator, ETc, a custom indicator, direct input, an import value, etc.

Here, a custom indicator denotes an indictor generated by the indicator generation unit 200. Further, direct input denotes an action of directly loading a comparative target produced as a file using a Dynamic Link Library (DLL) and directly inputting the comparative target. An import value denotes a value strategy set by the value setting unit 170.

The user can select an item such as the stock price of each individual business or the exchange rate of EUR/USD using the symbol select box 140-22.

Further, the user can select a time frame such as in a chart using the time frame select box 140-23, select a comparison period by selecting the number of bars or a period using the comparison period select box 140-24, and select an additional calculation value using the additional calculation value setting box 140-25.

Here, the term "additional calculation value" denotes a predetermined value additionally calculated for each selected value, wherein the selected value increases due to the additional calculation value.

Further, the user sets up a horizontal range that must be satisfied during the comparison period by clicking the input button of the horizontal range select box 140-3. In the select box 140-3, the number of candles may be designated which allows the comparison period to be set.

Furthermore, the user sets a vertical range that must be satisfied during the comparison period using the vertical range select box 140-4 on the movement strategy establishment screen. A minimum value is input into a first blank in the select box 140-4, and an equal sign or an inequality sign is selected and input into the next blank. The equal sign or the inequality sign of the maximum value is selected and input into the next blank, and the maximum value is input into the last blank. The range is defined by the maximum value and the minimum value, and the condition of being equal to or greater than, being equal to or less than, being less than, or being greater than a reference value is determined using an equal sign or an inequality sign.

Next, the user may select a change range that must occur during the comparison period using the change range select box 140-5 on the movement strategy establishment screen. A minimum value of a difference between the opening price and the closing price is input into a first blank in the select box 140-5, and an equal sign or an inequality sign is selected and input into the next blank. The equal sign or the inequality sign of the maximum value is selected and input into the next blank, and a maximum value of a difference between the opening price and the closing price is input into the last blank. The change range is defined by the maximum value and the minimum value, and the condition of being equal to or greater than, being equal to or less than, being less than, or being greater than a reference value is determined using an equal sign or an inequality sign.

Further, the use sets the range of the average change of each candle included in the comparison period using the average change input box 140-6 of the movement strategy establishment screen. A minimum value is input into a first blank in the select box 140-6, and an equal sign or an inequality sign is selected and input into the next blank. The equal sign or the inequality sign of the maximum value is selected and input into the next blank, and the maximum value is input into the last blank. The range is defined by the maximum value and the minimum value, and the condition of being equal to or greater than, being equal to or less than, being less than, or being greater than a reference value is determined using an equal sign or an inequality sign.

Next, the mutual comparison condition strategy establishment unit 150 establishes the mutual comparison condition strategies by setting the conditions of comparison between the prices, the indicators, and the oscillators. The comparative target to be compared by the mutual comparison condition strategy establishment unit 150 also includes a profit rate.

Here, the comparative target is represented by charts, for example, various types of time frame charts such as a five-minute chart, a 10-minute chart, and a 1-day chart.

Further, the price includes a comparison between the prices of individual stocks, raw material prices, and currency prices.

Such a mutual comparison condition strategy establishment unit 150 provides a mutual comparison condition generation screen to the user, and then receives mutual comparison conditions from the user.

Figure 19:
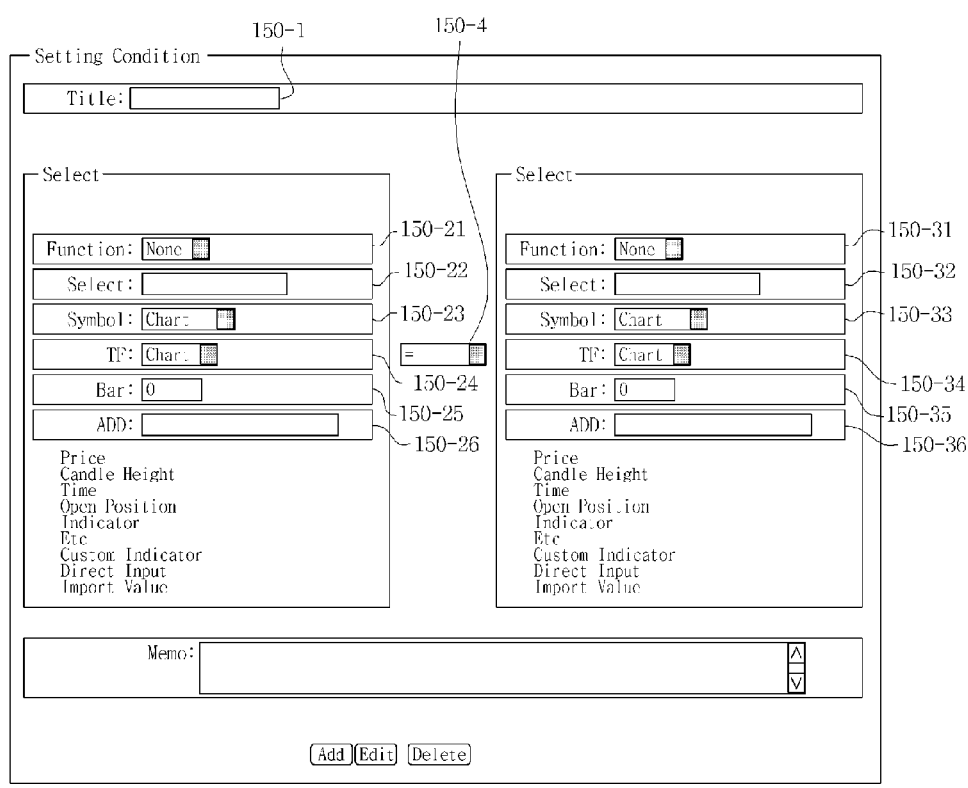

In regard to this function, an example of the mutual comparison condition generation screen provided by the mutual comparison screen strategy establishment unit 150 to the user is shown in FIG. 19. As shown in the drawing, the condition generation screens include a title input box 150-1, function select boxes 150-21 and 150-31, comparative target select boxes 150-22 and 150-32, symbol select boxes 150-23 and 150-33, time frame select boxes 150-24 and 150-34, comparison period select boxes 150-25 and 150-35, additional calculation value setting boxes 150-26 and 150-36, and a comparison method select box 150-4.

The user inputs a title using the title input box 150-1, and selects a function using the function select boxes 150-21 and 150-31.

In this case, the term "function" denotes comparison values such as the range, the highest value, the lowest value, the average, and the change of each candle included in the comparison period.

Further, the user can select a comparative target for an item selected from the symbol select boxes 150-22 and 150-32, for example, the stock price of each individual business or the exchange rate of EUR/USD, using the comparative target select boxes 150-21 and 150-31.

In this case, the comparative target that can be selected may be any one selected from among price, candle height, time, open position, an indicator, ETc, a custom indicator, direct input, an import value, etc.

Here, a custom indicator denotes an indictor generated by the indicator generation unit 200. Further, direct input denotes an action of directly loading a comparative target produced as a file using a Dynamic Link Library (DLL) and directly inputting the comparative target. An import value denotes a value strategy set by the value setting unit 170.

The user can select an item such as the stock price of each individual business or the exchange rate of EUR/USD using the symbol select boxes 150-22 and 150-32.

Further, the user can select a time frame such as in a chart using the time frame select boxes 150-23 and 150-33, select a comparison period by selecting the number of bars or a period using the comparison period select boxes 150-24 and 150-34, and select an additional calculation value using the additional calculation value setting boxes 150-25 and 150-35.

Here, the term "additional calculation value" denotes a predetermined value additionally calculated for each selected value, wherein the selected value increases due to the additional calculation value.

Finally, the condition of having to be, for example, identical to, greater than, or less than a certain value is selected using the comparison method select box 150-4.

Figure 20:
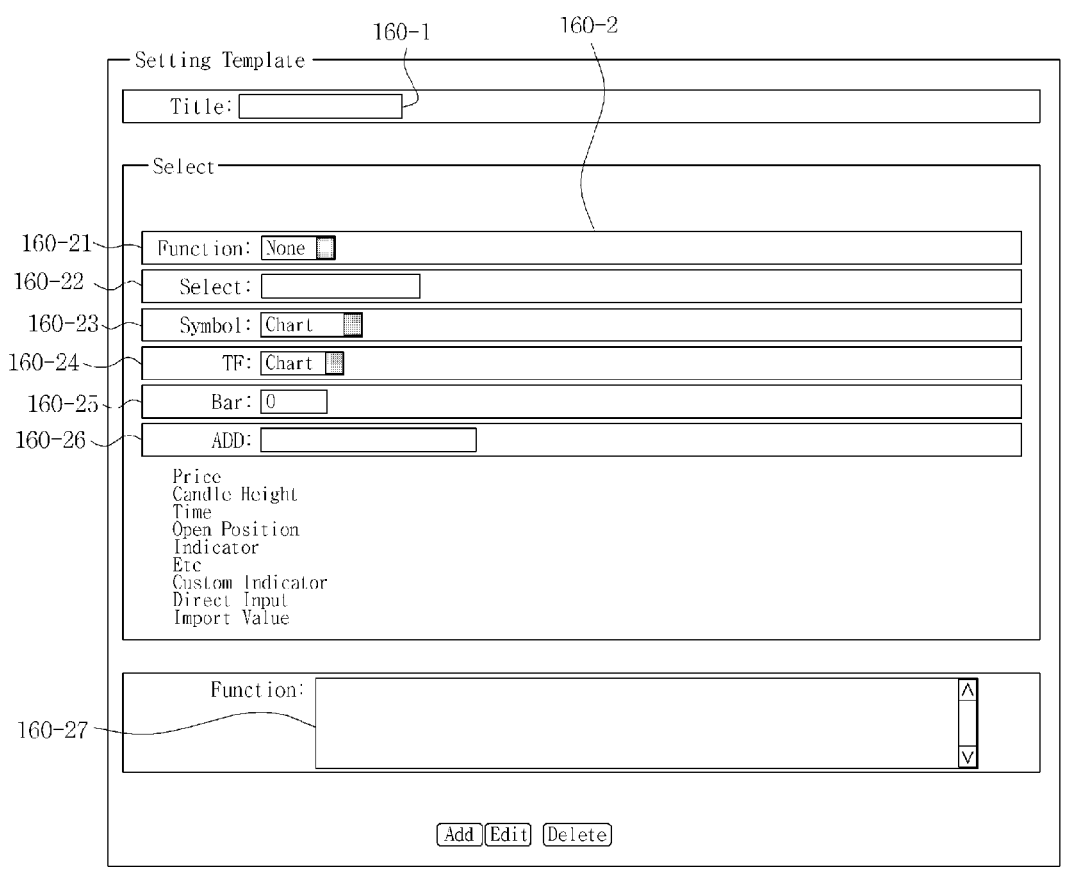

Next, the template generation unit 160 provides various types of generation tools so that the user can set templates. A template generation screen provided as shown in FIG. 20 includes a title input box 160-1 and a template condition input window 160-2.

The user sets a title by inputting the title into the title input box 160-1.

The template condition input window 160-2 includes a function select box 160-21, a comparative target select box 160-22, a symbol select box 160-23, a time frame select box 160-24, a comparison period select box 160-25, an additional calculation value setting box 160-26, and a function input box 160-27.

The user inputs a title using the title input box 160-1, and selects a function using the function select box 160-21 of the template condition input window 160-2.

Here, the term "function" denotes comparative values such as the highest value, the range change, and the average of each candle included in the comparison period.

Further, the user may select the comparative target for an item selected from the symbol select box 160-23, for example, the stock price of each individual business or the exchange rate of EUR or USD, using the comparative target select box 160-22.

In this case, the comparative target that can be selected may be any one selected from among price, candle height, time, open position, an indicator, ETc, a custom indicator, direct input, an import value, etc.

Here, a custom indicator denotes an indictor generated by the indicator generation unit 200. Further, direct input denotes an action of directly loading a comparative target produced as a file using a DLL and directly inputting the comparative target. An import value denotes a value strategy set by the value setting unit 170.

The user can select an item such as the stock price of each individual business or the exchange rate of EUR/USD using the symbol select box 160-23.

Further, the user can select a time frame such as in a chart using the time frame select box 160-24, select a comparison period by selecting the number of bars or a period using the comparison period select box 160-25, and select an additional calculation value using the additional calculation value setting box 160-26.

Here, the term "additional calculation value" denotes a predetermined value additionally calculated for each selected value, wherein the selected value increases due to the additional calculation value.

Further, the function input box 160-27 may be used to define functions using formulas required by the user to generate templates. The functions defined in this way may be invoked from the function select box 160-21 and may be used.

Figure 21:
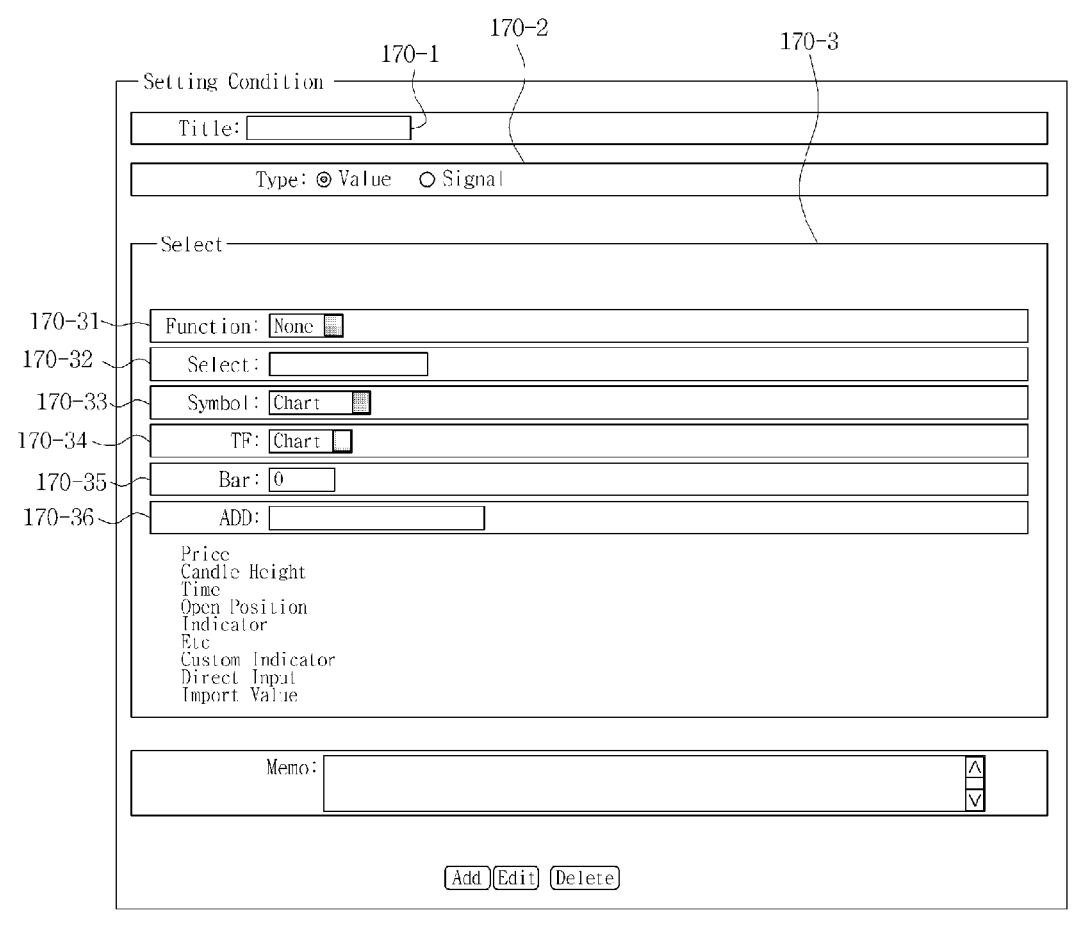

Next, the value setting unit 170 sets a value, and includes a title input box 170-1, a type setting box 170-2, and a condition input window 170-3, as shown in FIG. 21.

The user sets a title by inputting the title into the title input box 170-1.

Further, the type setting box 170-2 enables any one of types of a value and a signal to be selected.

Next, when a value is selected from the type setting box 170-2, the condition input window 170-3 is provided, whereas when a signal is selected, the signal setting window 170-4 is provided, as shown in FIG. 22.

The condition input window 170-3 includes a function select box 170-31, a comparative target select box 170-32, a symbol select box 170-33, a time frame select box 170-34, a comparison period select box 170-35, and an additional calculation value setting box 170-36.

The user selects a function using the function select box 170-31 of the condition input window 170-3.

Here, the term "function" denotes comparison values such as the range, the highest value, the lowest value, the average, and the change of each candle included in the comparison period.

Further, the user can select a comparative target for an item selected from the symbol select box 170-33, for example, the stock price of each individual business or the exchange rate of EUR/USD, using the comparative target select box 170-32.

In this case, the comparative target that can be selected may be any one selected from among price, candle height, time, open position, an indicator, ETc, a custom indicator, direct input, an import value, etc.

Here, a custom indicator denotes an indictor generated by the indicator generation unit 200. Further, direct input denotes an action of directly loading a comparative target produced as a file using a DLL and directly inputting the comparative target. An import value denotes a value strategy set by the value setting unit 170.

The user can select an item such as the stock price of each individual business or the exchange rate of EUR/USD using the symbol select box 170-33.

Further, the user can select a time frame such as in a chart using the time frame select box 170-34, select a comparison period by selecting the number of bars or a period using the comparison period select box 170-35, and select an additional calculation value using the additional calculation value setting box 170-36.

Here, the term "additional calculation value" denotes a predetermined value additionally calculated for each selected value, wherein the selected value increases due to the additional calculation value.

Meanwhile, the signal setting window 170-4 includes a signal generation strategy select box 170-41, a true select window 170-42, and a false select window 170-43.

The signal generation strategy select box 170-41 enables the strategy established by the signal generation strategy establishment unit 110 to be selected.

Further, the true select window 170-42 is activated when the condition of the selected signal generation strategy is satisfied, and the false select window 170-43 is activated when the condition of the selected signal generation strategy is not satisfied.

In this case, saying that the window is activated when the condition of the signal generation strategy is satisfied implies that, in the case where a relevant strategy established by the signal generation strategy establishment unit 110 is selected, when the strategy is satisfied, any one selected from among the price, candle height, time, open position, an indicator, ETc, a custom indicator, direct input, and an import value, which are related to the strategy, is indicated.

In order to provide such an environment, the value setting unit 170 includes the true select window 170-42 provided with a function select box 170-42-1, a comparative target select box 170-42-2, a symbol select box 170-42-3, a time frame select box 170-42-4, a comparison period select box 170-42-5, and an additional calculation value setting box 170-42-6.

The user selects a function using the function select box 170-42-1 of the true select window 170-42.

Here, the term "function" denotes comparison values such as the range, the highest value, the lowest value, the average, and the change of each candle included in the comparison period.

Further, the user can select a comparative target for an item selected from the symbol select box 170-42-3, for example, the stock price of each individual business or the exchange rate of EUR/USD, using the comparative target select box 170-42-2.

In this case, the comparative target that can be selected may be any one selected from among price, candle height, time, open position, an indicator, ETc, a custom indicator, direct input, an import value, etc.

Here, a custom indicator denotes an indictor generated by the indicator generation unit 200. Further, direct input denotes an action of directly loading a comparative target produced as a file using a DLL and directly inputting the comparative target. An import value denotes a value strategy set by the value setting unit 170.

The user can select an item such as the stock price of each individual business or the exchange rate of EUR/USD using the symbol select box 170-42-3.

Further, the user can select a time frame such as in a chart using the time frame select box 170-42-4, select a comparison period by selecting the number of bars or a period using the comparison period select box 170-42-5, and select an additional calculation value using the additional calculation value setting box 170-42-6.

Here, the term "additional calculation value" denotes a predetermined value additionally calculated for each selected value, wherein the selected value increases due to the additional calculation value.

In contrast, saying that the window is activated when the condition of the signal generation strategy is not satisfied implies that, in the case where a relevant strategy established by the signal generation strategy establishment unit 110 is selected, when the strategy is not satisfied, any one selected from among the price, candle height, time, open position, an indicator, ETc, a custom indicator, direct input, and an import value, which are related to the strategy, is indicated.

In order to provide such an environment, the value setting unit 170 includes the false select window 170-43 provided with a function select box 170-43-1, a comparative target select box 170-43-2, a symbol select box 170-43-3, a time frame select box 170-43-4, a comparison period select box 170-43-5, and an additional calculation value setting box 170-43-6.

The user selects a function using the function select box 170-43-1 of the false select window 170-43.

Here, the term "function" denotes comparison values such as the range, the highest value, the lowest value, the average, and the change of each candle included in the comparison period.

Further, the user can select a comparative target for an item selected from the symbol select box 170-43-3, for example, the stock price of each individual business or the exchange rate of EUR/USD, using the comparative target select box 170-43-2.

In this case, the comparative target that can be selected may be any one selected from among price, candle height, time, open position, an indicator, ETc, a custom indicator, direct input, an import value, etc.

Here, a custom indicator denotes an indictor generated by the indicator generation unit 200. Further, direct input denotes an action of directly loading a comparative target produced as a file using a DLL and directly inputting the comparative target. An import value denotes a value strategy set by the value setting unit 170.

The user can select an item such as the stock price of each individual business or the exchange rate of EUR/USD using the symbol select box 170-43-3.

Further, the user can select a time frame such as in a chart using the time frame select box 170-43-4, select a comparison period by selecting the number of bars or a period using the comparison period select box 170-43-5, and select an additional calculation value using the additional calculation value setting box 170-43-6.

Here, the term "additional calculation value" denotes a predetermined value additionally calculated for each selected value, wherein the selected value increases due to the additional calculation value.

Next, the option strategy establishment unit 180 may select and combine various options such as the maximum slippage (MaxSlippage), Maximum spread (MaxSpread), strategy activation time, and a reverse function. Here, the term "maximum slippage" denotes the maximum allowable difference between an expected filled price and an actual filled price, the term "maximum spread" denotes the maximum allowable difference between ask prices, the term "strategy activation time" denotes the time for which a strategy is executed, and the term "reverse function" denotes a function implemented such that, in the state in which a sell or buy position is fixed, when a reverse trading signal is generated, the currently fixed position is closed, and the reverse position is taken. In addition, the option strategy establishment unit 180 may select various options, such as the number of entries, the entry cost, the entry rate, the entry time, the number of exits, the exit cost, the exit rate, and the exit time.

For this function, the option strategy establishment unit 180 provides the user with an option strategy establishment screen, thus allowing the user to set various options.

In this case, an example of the option strategy establishment screen provided by the option strategy establishment unit 180 to the user is shown in FIG. 23 and includes a title input box 180-1 for receiving a title so that the set option is distinguished from other options, a maximum slippage input box 180-2, a maximum spread input box 180-3, and a trading allowable time setting box 180-4.

The user inputs a title into the title input box 180-1 on the option strategy establishment screen provided by the option strategy establishment unit 180, thus distinguishing the option strategy to be established from other option strategies.

The user may set an ask price at the maximum slippage for opening a trade or for closing a trade in the maximum slippage input box 180-2 on the option strategy establishment screen, provided by the option strategy establishment unit 180, by using an input button.

Further, the user may set an ask price at the maximum spread for opening a trade or for closing a trade in the maximum spread input box 180-3 on the option strategy establishment screen, provided by the option strategy establishment unit 180, by using an input button.

Furthermore, the user may set a trading time in the allowable trading time setting box 180-4 on the option strategy establishment screen, provided by the option strategy establishment unit 180, by using an input button.

When these conditions are set, the user completes and stores the option strategy having the relevant title by pressing a storage button.

Next, the fund management strategy establishment unit 190 establishes a fund management strategy. Here, the fund management strategy is a strategy for determining the available funds that can be used from among holding funds, and is configured to set the funds that can be used to fund trading strategies.

For this function, the fund management strategy establishment unit 190 provides the user with a fund management strategy screen, receives fund management conditions from the user, and then establishes the fund management strategy.

In this case, an example of the fund strategy management screen provided by the fund management strategy establishment unit 190 to the user is shown in FIG. 24, and includes a title input box 190-1 for the fund management strategy, a fund allocation select box 190-2, and a strategy termination fund select box 190-3.

The user allows the established fund management strategy to be distinguished from other fund management strategies by inputting a title into the title input box 190-1 on the fund strategy management screen provided by the fund management strategy establishment unit 190.

Further, the user may set the ratio of available funds to holding functions using an input button on the fund allocation select box 190-2 on the fund management strategy establishment screen provided by the fund management strategy establishment unit 190. As an example, this ratio is set to 10% in FIG. 24. The funds are applied within the range of a preset limit. Here, the ratio may be set to a percentage, but may also be set to an amount of money.

Furthermore, the user sets a fund that determines if a strategy is terminated, using the strategy termination fund select box 190-3 on the fund management strategy establishment screen provided by the fund management strategy establishment unit 190.

In this case, the user may terminate the strategy either when the fund increases by a predetermined amount (in FIG. 24, the case where the predetermined amount is set to 10% is shown as an example) or when the fund decreases by a predetermined amount (in FIG. 24, the case where the fund decreases by 10,000 Won is shown as an example).

Meanwhile, the indicator generation unit 200 provides a tool for allowing the user to set indicators. As shown in FIG. 25, the indicator generation unit 200 may include a title input box 200-1, a window type select box 200-2, an index counter 200-3, and a condition setting window 200-4.

The user may designate the title of each indicator by inputting the title using the title input box 200-1.

The window-type select box 200-2 includes select buttons for a chart and a separator, thus enabling a desired window type to be selected. Here, the term "chart" denotes a means for simultaneously showing indicators set in the chart, and the term "separator" denotes a means for showing the indicators using separate windows.

Further, the index counter 200-3 determines the number of indicators that can be displayed on a window. That is, the index counter determines the number of indicators that can be displayed in a single chart.

Further, the condition setting window 200-4 enables indicators that are desired to be set to be selected. Various types of indicators set by the user may be loaded and selected using the screen shown in FIG. 26.

Here, FIG. 26 illustrates an indicator setting screen, which includes a title input box 210-1, a label input box 210-2, a style setting box 210-3, a line thickness setting box 210-4, a color setting box 210-5, a type setting window 210-6, and a condition input window 210-7.

The user may designate a title by inputting the title into the title input box 210-1, and may input a label into the label input box 210-2 and store the label.

The user determines whether to represent a desired indicator by a line, a histogram, an arrow, a partial color, or a zigzag pattern, using the style setting box 210-3.

Further, the user may set the thickness of lines using the line thickness setting box 210-4, set a color using the color setting box 210-5, and select any one of value and signal types using the type setting box 210-6.

Next, when a value is selected from the type setting box 210-6, the condition input window 210-7 is provided. In contrast, when a signal is selected, a signal setting box (not shown, but refer to FIG. 22) is provided.

The condition input window 210-7 includes a function select box 210-71, a comparative target select box 210-72, a symbol select box 210-73, a time frame select box 210-74, a comparison period select box 210-75, and a value indication box 210-76.

The user selects a function using the function select box 210-71 of the condition input window 210-7.

Here, the term "function" denotes comparison values such as the range, the highest value, the lowest value, the average, and the change of each candle included in the comparison period.

Further, the user can select a comparative target for an item selected from the symbol select box 210-73, for example, the stock price of each individual business or the exchange rate of EUR/USD, using the comparative target select box 210-72.

In this case, the comparative target that can be selected may be any one selected from among price, candle height, time, open position, an indicator, ETc, a custom indicator, direct input, an import value, etc.

Here, a custom indicator denotes an indictor generated by the indicator generation unit 200. Further, direct input denotes an action of directly loading a comparative target produced as a file using a DLL and directly inputting the comparative target. An import value denotes a value strategy set by the value setting unit 170.

The user can select an item such as the stock price of each individual business or the exchange rate of EUR/USD using the symbol select box 210-73.

Further, the user can select a time frame such as in a chart using the time frame select box 210-74, and select a comparison period by selecting the number of bars or a period using the comparison period select box 210-75.

Further, a function may be set using the value indication box 210-76. In this case, the user may combine new set values by additionally performing various types of four fundamental arithmetic operations while the conditions that are set using the function select box 210-71, the comparative target select box 210-72, the symbol select box 210-73, the time frame select box 210-74, and the comparison period select box 210-75 are being displayed on the value setting box 210-76.

According to the above-described present invention, the combination of various binders, times, movements, and options is possible, thus enabling various types of strategies to be established.

Further, according to the present invention, various binders, times, movements, and options can be implemented in the format of an omnibus, thus enabling the range in which the user makes a selection to be widened.

Furthermore, according to the present invention, both complex consideration and selective consideration of various binders, times, movements, and options are allowed, thus enabling various strategies to be used.

As described above, according to the preset invention, since various types of items present over various instruments are implemented as a single synthetic group to manage strategies and to monitor the results of the strategies, the convenience of configuring a portfolio and monitoring the results of the portfolio is provided to a user at the time of making investments.

According to the present invention, a synthetic group is processed as if it had been a single item, and the results of the processing are shown to the user, thus allowing the user to easily determine the present condition of the synthetic group using various types of technical indicators.

According to the present invention, a synthetic group is set to a single item, and a graph of yield rates based on the execution of strategies is provided, so that virtual markets can be formed, thus providing virtual markets irrelevant to other traders and easily detecting trading times.

Further, according to the present invention, since a single trade is possible with reference to a virtual market, an infinite number of markets can be implemented, thus increasing the probability of efficiently making trades by recognizing patterns obtained from each market and by finding an interval in which traffic can be reduced.

Furthermore, according to the present invention, in the case of the movements of a yield curve based on instrument prices and strategies, the opening price of each chart (candlestick/bar) is regarded as the entry point and the closing price is regarded as the exit point, so that statistical values of price movements with the passage of time are acquired, thereby enabling trading to be made based on management factors that incorporate trading risk.

Furthermore, according to the present invention, it is predicted that from the standpoint of financial power and rules, even a group without much power can have many chances to find a profitable period for trading.

The reason for this is that values calculated based on a single instrument (for example, a yield curve) or values calculated based on synthetic instruments are bound with each individual associated instrument into a single instrument.

Generally, there are an incalculable number of investors in the world, and the binding of individual instruments associated with virtual markets produced by the investors may be differently conducted (yield curves may also be synthesized, and in the case where trading is conducted by referring to only yield curves, the strategies of individual persons differ, and trading is made with reference to charts filtered using those strategies, and thus there is a low probability that the markets of the investors will be duplicated).

That is, it is expected that the priority of financial power will be decreased compared to the prior art due to the infinite number of cases and infinite binding which occurs without overlapping in a single market. Further, the case where the combination of individual independent attributes in a virtual market differs for each investor means that each gamer does not know other gamers' cards, using the example of poker. This feature is expected to decrease market-based patterns and traffic which have been overheated for over a half a century, rapid price fluctuations caused by fundamental information, and the inflaming of markets using huge funds.

Further, since virtual markets enable trading to be conducted using each individual instrument, they can be easily applied to algorithm-based system trading that has been gradually activated.

As described above, the preset invention is advantageous in that the combination of various binders, times, movements, and options is possible, thus enabling various types of strategies to be established.

Further, the present invention is advantageous in that various binders, times, movements, and options can be implemented in the format of an omnibus, thus enabling the range in which the user makes a selection to be widened.

Furthermore, the present invention is advantageous in that both complex consideration and selective consideration of various binders, times, movements, and options are allowed, thus enabling various strategies to be used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A trading market provision system using synthesis of instruments, comprising:
a synthesis unit configured to provide an instrument synthesis screen and a ratio selection screen to a user terminal over a communication network, and receiving selected instruments, selected items, and a synthesis ratio from the user terminal, and forming a synthetic group composed of individual items, each having a minimum quantity;
a synthetic price calculation unit configured to form a synthetic price for the synthetic group formed by the synthesis unit, receive real-time prices of the respective items that form the synthetic group from a securities/futures computerization agency, and calculate a change in the synthetic price of the synthetic group; and
a display unit configured to display the change in the synthetic price calculated by the synthetic price calculation unit.

2. The trading market provision system as set forth in claim 1, wherein instruments that can be selected by a user using the user terminal from the instrument synthesis screen provided by the synthesis unit comprise at least one of stocks, bonds, futures, options, and currency.

3. The trading market provision system as set forth in claim 1, wherein a selection ratio provided by the synthesis unit via the ratio selection screen is a selection ratio based on prices.

4. The trading market provision system as set forth in claim 1, wherein the synthetic price calculation unit calculates the synthetic price by calculating converted prices of the respective items using the following equation and adding up calculated converted prices:

$$\text{converted price} = (\text{price(or index)}/\text{tick size}) * \text{tick value} * \text{exchange rate}.$$

5. The trading market provision system as set forth in claim 1, further comprising:
a strategy establishment device configured to receive a strategy required to determine a trading time for the synthetic group calculated by the synthesis unit from the user via the user terminal and then establishing trading strategies; and
a strategy execution unit configured to conduct virtual trading for the synthetic group depending on the strategies established by the strategy establishment device and calculating profits based on the virtual trading,
wherein the display unit displays the profits calculated when the strategy execution unit executes the strategies.

6. The trading market provision system as set forth in claim 1, further comprising a trading support unit configured to receive a trading request for the synthetic group from the user via the user terminal and conducting trading.

7. The trading market provision system as set forth in claim 1, further comprising a correlation calculation unit configured to calculate and provide correlations between synthetic prices of synthetic groups calculated by the synthetic price calculation unit.

8. The trading market provision system as set forth in claim 1, wherein the display unit displays a change in the synthetic price calculated by the synthetic price calculation unit in a form of a candlestick chart.

9. The trading market provision system as set forth in claim 1, wherein the synthesis unit is configured such that when an expiration of an options instrument has been reached, trading of the options instrument exits and the options instrument is deleted from the synthetic group, and such that a futures instrument and other expired instruments are automatically rolled over as outstanding objects, thus enabling the synthetic group to be maintained.

10. The trading market provision system as set forth in claim 1, wherein the strategy establishment device comprises:
a mutual comparison condition strategy establishment unit configured to set comparison conditions between price, indicators, and oscillators and then establish a plurality of mutual comparison condition strategies;
a signal generation strategy establishment unit configured to combine the plurality of mutual comparison condition strategies established by the mutual comparison condition strategy establishment unit, thus establishing a plurality of signal generation strategies; and
a strategy establishment unit configured to combine the plurality of signal generation strategies established by the signal generation strategy establishment unit, thus establishing trading strategies.

11. The trading market provision system as set forth in claim 5, wherein the strategy execution unit calculates and provides technical indicators for the profits.

12. The trading market provision system as set forth in claim 11, wherein the strategy execution unit provides technical indicators for different time frames so that they overlap with each other when calculating and providing the technical indicators for the profits.

13. The trading market provision system as set forth in claim 5, wherein the strategy execution unit provides a plurality of results of execution based on a plurality of strategies by displaying the execution results on the display unit.

14. The trading market provision system as set forth in claim 5, wherein the strategy execution unit provides a total profit, obtained by adding up results of execution based on a plurality of strategies, by displaying the total profit on the display unit.

15. The trading market provision system as set forth in claim 5, wherein the display unit displays results of the virtual trading conducted by the strategy execution unit in a form of a candlestick chart.

16. The trading market provision system as set forth in claim 5, further comprising a report provision unit configured to provide the results of virtual trading conducted by the strategy execution unit in a format of a report.

17. The trading market provision system as set forth in claim 16, wherein the report provided by the report provision unit comprises at least one of a drawdown, a drawdown percentage, a trading profit, a trading profit percentage, a number of successive profits, successive profits, a number of successive losses, and successive losses.

18. The trading market provision system as set forth in claim 17, wherein data provided by the report provision unit is data calculated by regarding an opening price of each candle in a candlestick chart as an entry point and regarding a closing price of the candle as an exit point in relation to the results of virtual trading conducted by the strategy execution unit.

19. The trading market provision system as set forth in claim 5, further comprising a trading support unit configured to receive a trading request for the synthetic group from the user via the user terminal and conducting trading.

20. The trading market provision system as set forth in claim 19, wherein the trading support unit automatically conducts trading based on trading conditions for the synthetic group when the trading conditions for the synthetic group are received from the user via the user terminal.

21. The trading market provision system as set forth in claim 19, wherein the trading support unit provides a room function of showing present conditions of accounts corresponding to respective items and possible quantities of items that are tradable.

22. The trading market provision system as set forth in claim 19, wherein the trading support unit provides, in a case of futures, a gauge function of reporting that an expiration date is approaching and reporting when a maintenance margin increases or decreases and whether to fill the maintenance margin based on the increase/decrease in the maintenance margin.

23. The trading market provision system as set forth in claim 19, further comprising a report provision unit configured to provide results of trading conducted by the trading support unit in a format of a report.

24. The trading market provision system as set forth in claim 7, wherein the display unit provides the correlations calculated by the correlation calculation unit in a form of a chart.

25. The trading market provision system as set forth in claim 10, further comprising a binder strategy establishment unit configured to combine the plurality of mutual comparison condition strategies established by the mutual comparison condition strategy establishment unit, thus establishing a plurality of binder strategies.

26. The trading market provision system as set forth in claim 10, further comprising:
a movement strategy establishment unit configured to define conditions related to movements, appear during a predetermined comparison period, for a comparative target, thus establishing movement strategies;
a template generation unit configured to set functions, comparative targets, and predetermined comparison periods, thus generating a plurality of templates; and
a time strategy establishment unit configured to combine the plurality of mutual comparison condition strategies established by the mutual comparison condition strategy establishment unit, the plurality of movement strategies established by the movement strategy establishment unit, and the plurality of templates generated by the template generation unit, thus establishing time strategies,
wherein the strategy establishment unit combines the time strategies established by the time strategy establishment unit, thus establishing the trading strategies, and
wherein the signal generation strategy establishment unit combines the time strategies established by the time strategy establishment unit, thus establishing signal generation strategies.

27. The trading market provision system as set forth in claim 26, further comprising a value setting unit configured to set values by defining functions, comparative targets, and predetermined comparison periods, or setting values based on whether the signal generation strategies established by the signal generation strategy establishment unit have been fulfilled,
wherein the mutual comparison condition strategy establishment unit establishes the mutual comparison condition strategies using the values set by the value setting unit, the movement strategy establishment unit establishes the movement strategies using the values set by the value setting unit, and the template generation unit sets the templates using the values set by the value setting unit.

28. The trading market provision system as set forth in claim 10, further comprising:
- an option strategy establishment unit configured to combine maximum slippage (Maxslippage), maximum spread (Maxspread), strategy activation time, and a reverse function, thus establishing option strategies; and
- a fund management strategy establishment unit configured to establish fund management strategies required to determine available funds from among holding funds,
- wherein the strategy establishment unit combines the option strategies established by the option strategy establishment unit and the fund management strategies established by the fund management strategy establishment unit with the established trading strategies.

29. The trading market provision system as set forth in claim 10, further comprising:
- an indicator generation unit configured to define functions, comparative targets, and predetermined comparison periods, thus generating indicators,
- wherein the mutual comparison condition strategy establishment unit establishes strategies using the indicators generated by the indicator generation unit.

30. A trading market provision method using synthesis of instruments, comprising:
- (A) a synthesis unit providing an instrument synthesis screen and a ratio selection screen to a user terminal over a communication network, and receiving selected instruments, selected items, and a synthesis ratio from the user terminal, and forming a synthetic group composed of individual items, each having a minimum quantity;
- (B) a synthetic price calculation unit forming a synthetic price for the synthetic group formed by the synthesis unit, receiving real-time prices of the respective items that form the synthetic group from a securities/futures computerization agency, and calculating a change in the synthetic price of the synthetic group; and
- (C) a display unit displaying the change in the synthetic price calculated by the synthetic price calculation unit.

31. The trading market provision method as set forth in claim 30, further comprising:
- (D) when an expiration of an options instrument has been reached, the synthesis unit causing trading of the options instrument to exit and deleting the options instrument from the synthetic group; and
- (E) automatically rolling over a futures instrument and other expired instruments as outstanding objects, thus enabling the synthetic group to be maintained.

32. The trading market provision method as set forth in claim 30, further comprising:
- (F) a strategy establishment device receiving a strategy required to determine a trading time for the synthetic group calculated by the synthesis unit from the user via the user terminal and then establishing trading strategies;
- (G) a strategy execution unit conducting virtual trading for the synthetic group depending on the strategies established by the strategy establishment device and calculating profits based on the virtual trading; and
- (H) the display unit displaying the profits calculated when the strategy execution unit executes the strategies.

33. The trading market provision method as set forth in claim 30, wherein instruments that can be selected by a user using the user terminal from the instrument synthesis screen provided by the synthesis unit comprise at least one of stocks, bonds, futures, options, and currency.

34. The trading market provision method as set forth in claim 30, wherein a selection ratio provided by the synthesis unit via the ratio selection screen is a selection ratio based on prices.

35. The trading market provision method as set forth in claim 30, wherein the synthetic price calculation unit calculates the synthetic price by calculating converted prices of the respective items using the following equation and adding up calculated converted prices:

converted price=(price(or index)/tick size)*tick value*exchange rate.

36. The trading market provision method as set forth in claim 32, further comprising:
- (I) a report provision unit providing results of virtual trading conducted by the strategy execution unit in a format of a report.

37. The trading market provision method as set forth in claim 36, wherein the report provision unit provides a report which includes at least one of a drawdown, a drawdown percentage, a trading profit, a trading profit percentage, a number of successive profits, successive profits, a number of successive losses, and successive losses, which are calculated by regarding an opening price of each candle in a candlestick chart as an entry point and regarding a closing price of the candle as an exit point in relation to results of virtual trading conducted by the strategy execution unit.

38. The trading market provision method as set forth in claim 32, further comprising:
- (J) the strategy execution unit calculating and providing technical indicators for the profits.

39. The trading market provision method as set forth in claim 38, wherein the strategy execution unit provides technical indicators for different time frames so that they overlap with each other when calculating and providing the technical indicators for the profits.

40. The trading market provision method as set forth in claim 32, further comprising:
- (K) the strategy execution unit executing strategies based on a plurality of strategies, and providing a total profit, obtained by adding up results of the execution, by displaying the total profit on the display unit.

41. The trading market provision method as set forth in claim 32, wherein the display unit displays results of virtual trading conducted by the strategy execution unit in a form of a candlestick chart.

42. The trading market provision method as set forth in claim 30, further comprising:
- (L) a trading support unit receiving a trading request for the synthetic group from the user via the user terminal and conducting trading.

43. The trading market provision method as set forth in claim 42, further comprising:
- (M) a report provision unit providing results of trading conducted by the trading support unit in a format of a report.

44. The trading market provision method as set forth in claim 30, further comprising:
- (N) a correlation calculation unit calculating and providing correlations between synthetic prices of synthetic groups calculated by the synthetic price calculation unit.

* * * * *